(12) United States Patent
Son et al.

(10) Patent No.: US 10,302,326 B2
(45) Date of Patent: May 28, 2019

(54) AIR CONDITIONER WITH HOUSING HAVING DISCHARGE HOLES AND CONTROL METHOD THEREOF

(71) Applicant: Samsung Electronics Co., Ltd., Suwon-si (KR)

(72) Inventors: Kil Soo Son, Ansan-si (KR); Seok Kyun Kim, Hwaseong-si (KR); Cheol Min Jo, Suwon-si (KR); Dong Suk Kim, Suwon-si (KR); Jong Gil Park, Seongnam-si (KR); Byoung-Ok Ahn, Suwon-si (KR); Hong Seok Jun, Suwon-si (KR); Oh Kun Chung, Seoul (KR); Jung Rok Heo, Suwon-si (KR); Jun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/608,013

(22) Filed: May 30, 2017

(65) Prior Publication Data
US 2018/0172305 A1 Jun. 21, 2018

(30) Foreign Application Priority Data
Dec. 21, 2016 (KR) .......................... 10-2016-0175616

(51) Int. Cl.
*F24F 11/02* (2006.01)
*F24F 11/30* (2018.01)
(Continued)

(52) U.S. Cl.
CPC .............. *F24F 11/30* (2018.01); *F24F 11/77* (2018.01); *F24F 11/79* (2018.01); *F24F 11/86* (2018.01);
(Continued)

(58) Field of Classification Search
CPC ................. F25B 49/022; F25B 49/025; F25B 2600/025; F25B 2600/0253;
(Continued)

(56) References Cited

U.S. PATENT DOCUMENTS

| 7,040,101 | B2 | 5/2006 | Takeda et al. |
| 2016/0131384 | A1 | 5/2016 | Yoon et al. |
| 2016/0313042 | A1* | 10/2016 | Popli .................... F25B 49/022 |

FOREIGN PATENT DOCUMENTS

| EP | 1925887 | 5/2008 |
| JP | 3-91469 | 4/1991 |

(Continued)

OTHER PUBLICATIONS

JP 2016-99032 (English translation).*
JP 58-43343 (English abstract).*
International Search Report dated Sep. 21, 2017 in International Patent Application No. PCT/KR2017/005784.

*Primary Examiner* — Jonathan Bradford
(74) *Attorney, Agent, or Firm* — Staas & Halsey LLP

(57) ABSTRACT

An air conditioner maintains a pleasant indoor temperature or humidity without making a user feel wind speed. The air conditioner includes a housing comprising a discharge plate having a plurality of discharge holes and an outlet, a heat exchanger configured to exchange heat with air introduced into the housing, a blower fan configured to allow the heat-exchanged air to flow through the discharge plate or the outlet, a discharge blade having a plurality of blade holes and configured to open and close the outlet; and a controller configured to control the heat-exchanged air to be discharged through the discharge holes and the blade holes when the outlet is closed and configured to reduce a frequency of a compressor to a predetermined value when an indoor relative humidity is within a predetermined range.

17 Claims, 14 Drawing Sheets

(51) Int. Cl.
*F24F 13/10* (2006.01)
*F25B 49/02* (2006.01)
*F24F 13/08* (2006.01)
*F24F 11/79* (2018.01)
*F24F 11/77* (2018.01)
*F24F 11/86* (2018.01)
*F24F 13/22* (2006.01)
*F24F 110/20* (2018.01)
*F24F 110/10* (2018.01)

(52) U.S. Cl.
CPC ............ *F24F 13/082* (2013.01); *F24F 13/10* (2013.01); *F25B 49/022* (2013.01); *F24F 13/22* (2013.01); *F24F 2110/10* (2018.01); *F24F 2110/20* (2018.01); *F25B 2600/0253* (2013.01); *F25B 2600/11* (2013.01)

(58) Field of Classification Search
CPC ... F25B 2700/02; F24F 11/0001; F24F 11/74; F24F 11/76; F24F 11/79; F24F 13/08; F24F 13/082; F24F 13/10; F24F 2110/20
See application file for complete search history.

(56) References Cited

FOREIGN PATENT DOCUMENTS

| | | |
|---|---|---|
| JP | 8-285353 | 11/1996 |
| JP | 2016-99032 | 5/2016 |
| KR | 10-1999-0019558 | 3/1999 |
| KR | 10-2003-0030413 | 4/2003 |
| KR | 10-2005-0046099 | 5/2005 |
| KR | 10-2012-0050325 | 5/2012 |
| KR | 10-2015-0125343 | 11/2015 |

* cited by examiner

AIR CONDITIONER WITH HOUSING HAVING DISCHARGE HOLES AND CONTROL METHOD THEREOF

CROSS-REFERENCE TO RELATED APPLICATION(S)

This application claims the benefit of Korean Patent Application No. 10-2016-0175616, filed on Dec. 21, 2016 in the Korean Intellectual Property Office, the disclosure of which is incorporated herein by reference.

BACKGROUND

1. Field

Embodiments of the present disclosure relate to an air conditioner and a method of controlling the same, and more particularly, to an air conditioner discharging air in an enhanced method and a method of controlling the same.

2. Description of the Related Art

An air conditioner refers to an apparatus that adjusts indoor air suitably for human activities by using a refrigeration cycle. An air conditioner may cool a room by repeating the operation of sucking warm air from the room and discharging cool air heat-exchanged by using a low-temperature refrigerant into the room or heat the room by the opposite operation.

An air conditioner may cool or heat a room by a refrigeration cycle that circulates a refrigerant through a compressor, a condenser, an expansion valve, and an evaporator forward or backward. The compressor provides a gaseous refrigerant at a high temperature and a high pressure. The condenser provides a liquid refrigerant at room temperature and a high pressure. The expansion valve reduces the pressure of the liquid refrigerant at room temperature and a high pressure. The evaporator evaporates the decompressed refrigerant into a gaseous refrigerant at a low temperature.

Air conditioners may be classified into split-type air conditioners in which an indoor unit and an outdoor unit are separately installed and integrated-type air conditioners in which an indoor unit and an outdoor unit are installed together in one cabinet.

In the case of a split-type air conditioner in which an outdoor unit and an indoor unit are separated from each other, a compressor and a condenser (outdoor heat exchanger) are generally provided in the outdoor unit, and an evaporator (indoor heat exchanger) is provided in the indoor unit. A refrigerant may circulate through the outdoor unit and the indoor unit via pipes connecting the indoor unit and the outdoor unit. In addition, the indoor unit of the spit-type air conditioner includes a heat exchanger that performs heat exchange of air sucked into a panel and a blower fan that sucks air from a room into the panel and blows the sucked air back into the room. An indoor unit of conventional air conditioners has been fabricated to reduce the size of a heat exchanger and increase speed and volume of air discharged therefrom by increasing revolutions per minute (RPM) of the blower fan. Thus, temperature of air discharged decreases and air is discharged into the room as a narrow and long stream.

Recently, extensive research has been conducted into an air conditioner that maintains pleasant room temperature without making users feel wind speed of cool air of the air conditioner by decreasing speed of air discharged through outlets of the air conditioner. Research into methods of preventing condensation of an air conditioner has also been conducted.

SUMMARY

Therefore, it is an aspect of the present disclosure to provide an air conditioner to maintain pleasant indoor temperature or humidity without making a user feel wind speed by performing a cooling operation at a low speed through fine holes formed in the air conditioner based on an indoor temperature or indoor humidity and to prevent condensation on the surface of the air conditioner, and a method of controlling the same.

Additional aspects of the disclosure will be set forth in part in the description which follows and, in part, will be obvious from the description, or may be learned by practice of the disclosure.

In accordance with one aspect of the present disclosure, an air conditioner includes: a housing comprising a discharge plate having a plurality of discharge holes and an outlet; a heat exchanger configured to exchange heat with air introduced into the housing; a blower fan configured to allow the heat-exchanged air to flow through the discharge plate or the outlet; a discharge blade having a plurality of blade holes and configured to open and close the outlet; and a controller configured to control the heat-exchanged air to be discharged through the discharge holes and the blade holes when the outlet is closed and configured to reduce a frequency of a compressor to a predetermined value when an indoor relative humidity is within a predetermined range.

The controller may control cooling in a first operation mode to decrease the frequency of the compressor to a first frequency when the indoor relative humidity is equal to or higher than a preset first relative humidity and lower than a preset second relative humidity.

The controller may calculate the first frequency of the compressor based on an indoor relative humidity and an indoor temperature, and the first frequency varies within a predetermined range in accordance with the changes of the indoor relative humidity and the indoor temperature.

The controller may control cooling in a second operation mode to decrease the frequency of the compressor to a second frequency when the indoor relative humidity is equal to or higher than a preset second relative humidity.

The second frequency may be lower than the first frequency and a fixed frequency as a predetermined value, and the second relative humidity may be higher than the first relative humidity.

The controller may control the discharge blade to open the outlet to discharge the heat-exchanged air through the outlet when cooling is performed in the second operation mode for a predetermined time.

The controller may control cooling in a third operation to increase the frequency of the compressor to a third frequency when cooling is performed in the second operation mode for the predetermined time.

The controller may increase the rotation speed of the blower fan to increase a speed of air discharged through the open outlet when cooling is performed in the second operation mode for the predetermined time.

The air conditioner may further include: a humidity sensor configured to acquire information about a relative humidity by sensing the indoor humidity; and a temperature sensor configured to sense the indoor temperature.

In accordance with another aspect of the present disclosure, an air conditioner includes: a housing comprising a discharge plate having a plurality of discharge holes and an outlet; a heat exchanger configured to exchange heat with air introduced into the housing; a blower fan configured to allow the heat-exchanged air to flow through the discharge plate or the outlet; a discharge blade having a plurality of blade holes and configured to open and close the outlet; and a controller configured to control a first cooling operation based on a predetermined frequency of a compressor and a predetermined rotation speed of the blower fan upon receiving a command to close the outlet and discharge the heat-exchanged air through the discharge holes and the blade holes and configured to convert the first cooling operation into a second cooling operation when an indoor temperature is higher than a predetermined value after a predetermined time from a start of the first cooling operation.

The controller may maintain the first cooling operation when the indoor temperature is lower than the predetermined value.

The controller may convert the first cooling operation into the second cooling operation in which the frequency of the compressor is higher than the predetermined frequency when the indoor temperature is higher than the predetermined value.

The controller may converts the first cooling operation into the second cooling operation in which the rotation speed of the blower fan is higher than the predetermined rotation speed when the indoor temperature is higher than the predetermined value.

The controller may converts the first cooling operation into the second cooling operation when the indoor temperature is equal to or lower than a predetermined value after a given time from a start of the second cooling operation.

The air conditioner may further include an input configured to receive a control command to close the outlet and discharge the heat-exchanged air through the discharge holes and the blade holes.

The first cooling operation and the second cooling operation may be cooling operations to close the outlet and discharge the heat-exchanged air through the discharge holes and the blade holes.

In accordance with another aspect of the present disclosure, an air conditioner includes: a housing comprising a discharge plate having a plurality of discharge holes and an outlet; a heat exchanger configured to exchange heat with air introduced into the housing; a blower fan configured to allow the heat-exchanged air to flow through the discharge plate or the outlet; a discharge blade having a plurality of blade holes and configured to open and close the outlet; and a controller configured to control a direct cooling operation to open the outlet and discharge the heat-exchanged air through the outlet and to control an indirect cooling operation to close the outlet and discharge the heat-exchanged air through the discharge holes and the blade holes when an indoor temperature reaches a preset value.

The controller may maintain the indoor temperature at the preset value by controlling the indirect cooling operation.

The controller may perform a dehumidification operation to remove moisture from a room when the indoor temperature reaches a predetermined first setting value during the direct cooling operation.

When the indoor temperature may reach a predetermined second setting value, the controller maintains the indoor temperature at the second setting value by performing the indirect cooling operation.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
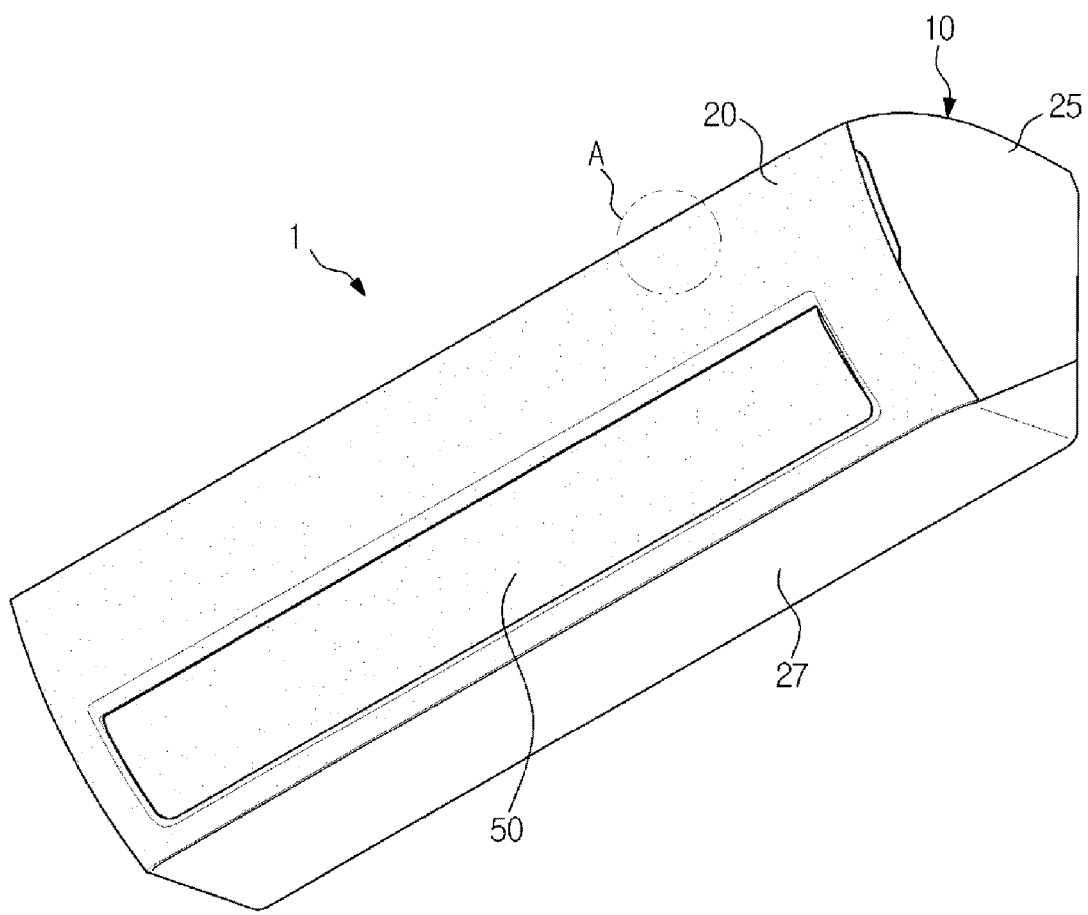
FIG. 1 is a perspective view illustrating an air conditioner according to an embodiment.

Reference will now be made in detail to the embodiments of the present disclosure, examples of which are illustrated in the accompanying drawings, wherein like reference numerals refer to like elements throughout.

The present disclosure will now be described more fully with reference to the accompanying drawings, in which exemplary embodiments of the disclosure are shown.

The present disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Hereinafter, an air conditioner and a method of controlling the same according to an embodiment will be described in detail with reference to the accompanying drawings.

An indoor unit of conventional air conditioners has been fabricated to reduce the size of a heat exchanger and increase speed and volume of air discharged therefrom by increasing revolutions per minute (RPM) of the blower fan. Thus, temperature of air discharged decreases and air is discharged into the room as a narrow and long stream.

While a user may feel chilly and unpleasant when in direct contact with cool air discharged from an air conditioner, the user may feel hot and unpleasant at a far distance from the discharged cool air.

In addition, if the RPM of the blower fan is increased to realize a high wind speed, the noise increases. In the case of radiation air conditioners for air conditioning without using the blower fan, a larger panel is required to have the same capability as the air conditioner using the blower fan. Also, the radiation air conditioners have a very low cooling speed and are manufactured with very high costs.

The air conditioner may include a heat exchanger to exchange heat with air sucked into a housing defining an appearance of the air conditioner and a blower fan to suck air from a room into the housing and blow the sucked air back into the room.

However, when air is blown by the blower fan, the conditioned air is discharged directly toward a subject via an outlet of the housing. In this case, the subject may feel uncomfortable due to local cooling or heating, for example, direct contact with the conditioned air.

Although the air conditioner according to an embodiment will be described based on a cooling operation thereof, embodiments of the present disclosure may also be applied to a heating operation of the air conditioner.

A refrigeration cycle of the air conditioner is performed by using a compressor, a condenser, an expansion valve, and an evaporator. The refrigeration cycle includes a series of processes involving compression, condensation, expansion, and evaporation and supplies low-temperature air into the room after heat exchange between high-temperature air and a low-temperature refrigerant.

The compressor compresses a gaseous refrigerant and discharges the compressed refrigerant in a high-temperature and high-pressure state. The discharged refrigerant gas flows into the condenser. The condenser condenses the compressed refrigerant into a liquid phase and releases heat to the surroundings via a condensation process. The expansion valve expands the liquid phase refrigerant compressed in the condenser in a high-temperature and high-pressure state into a liquid refrigerant in a low-pressure state. The evaporator evaporates the refrigerant expanded in the expansion valve. The evaporator achieves refrigeration effects via heat exchange with a material to be cooled using latent heat of the refrigerant and returns the refrigerant gas in a low-temperature and low-pressure state to the compressor. Throughout this cycle, temperature of indoor air may be controlled.

An outdoor unit of the air conditioner refers to a part of the refrigeration cycle including the compressor and an outdoor heat exchanger. The expansion valve may be provided in an indoor unit or outdoor unit, and an indoor heat exchanger is disposed in the indoor unit of the air conditioner.

The present disclosure provides an air conditioner that cools an indoor space. An outdoor heat exchanger serves as a condenser, and an indoor heat exchanger serves as an evaporator. Hereinafter, an indoor unit including the indoor heat exchanger will be referred to as an air conditioner, and the indoor heat exchanger will be referred to as a heat exchanger.

Figure 2:
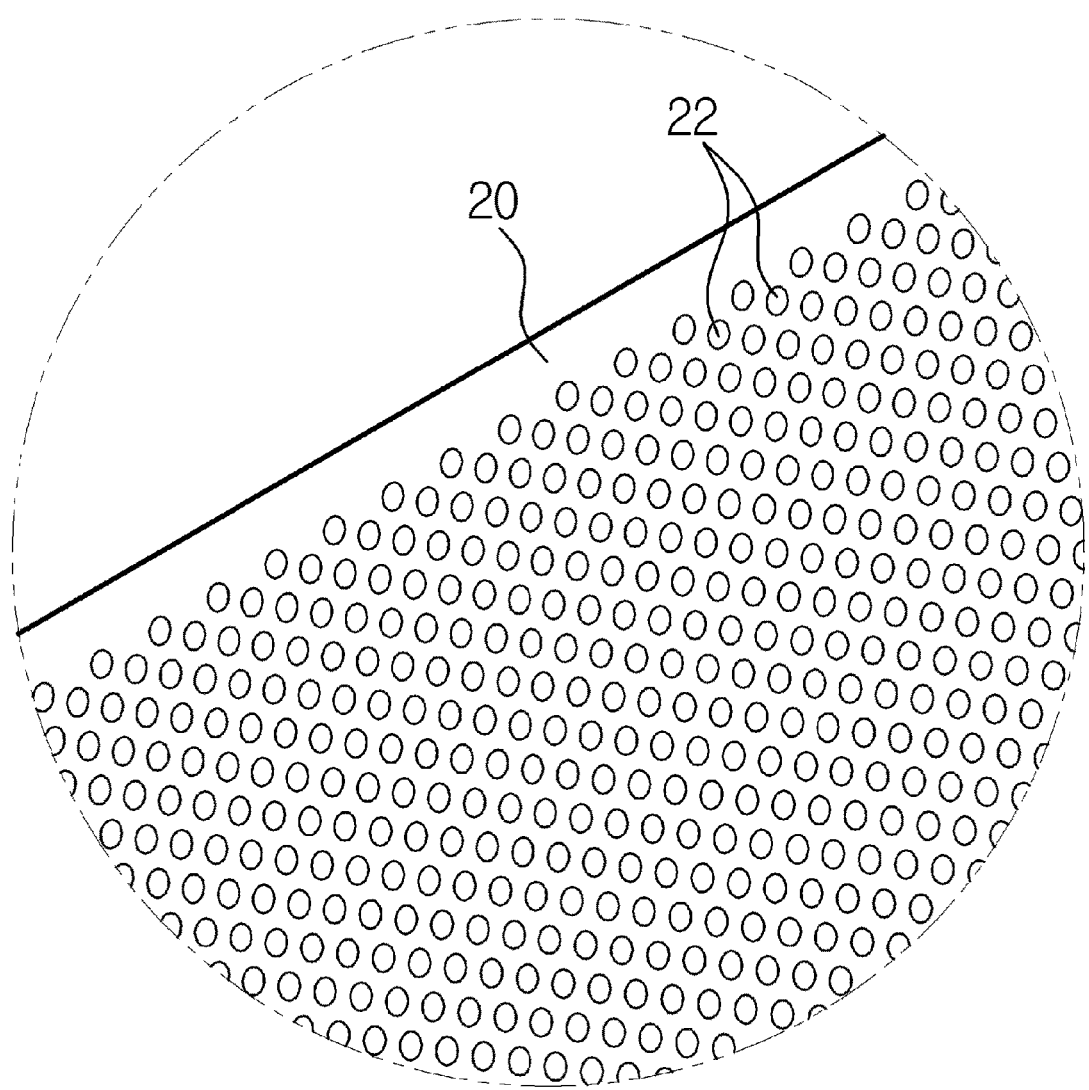
FIG. 2 is an enlarged view of a portion A of FIG. 1.
Figure 3:
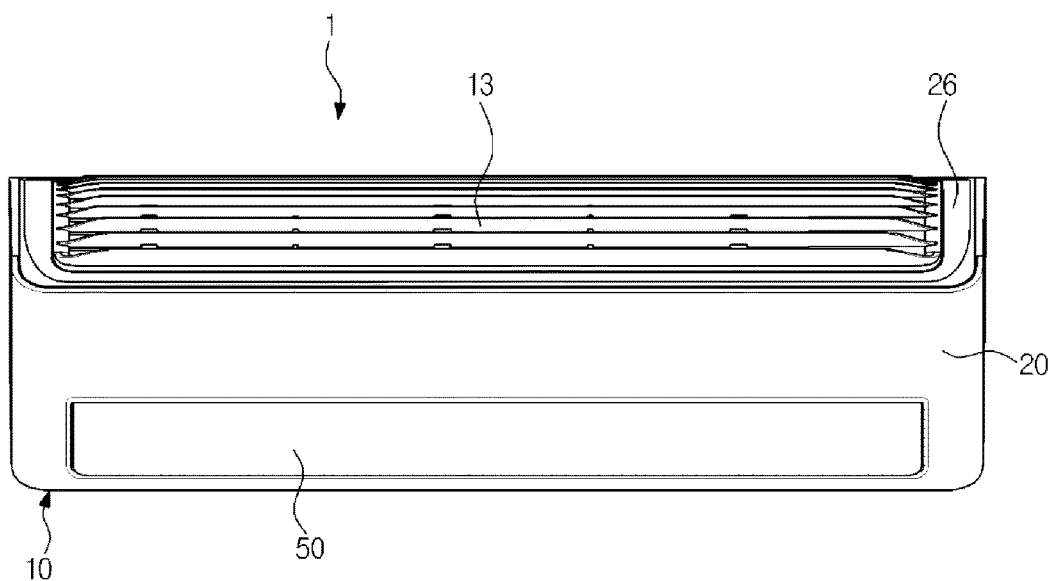
FIG. 3 is a front view of the air conditioner.
Figure 4:
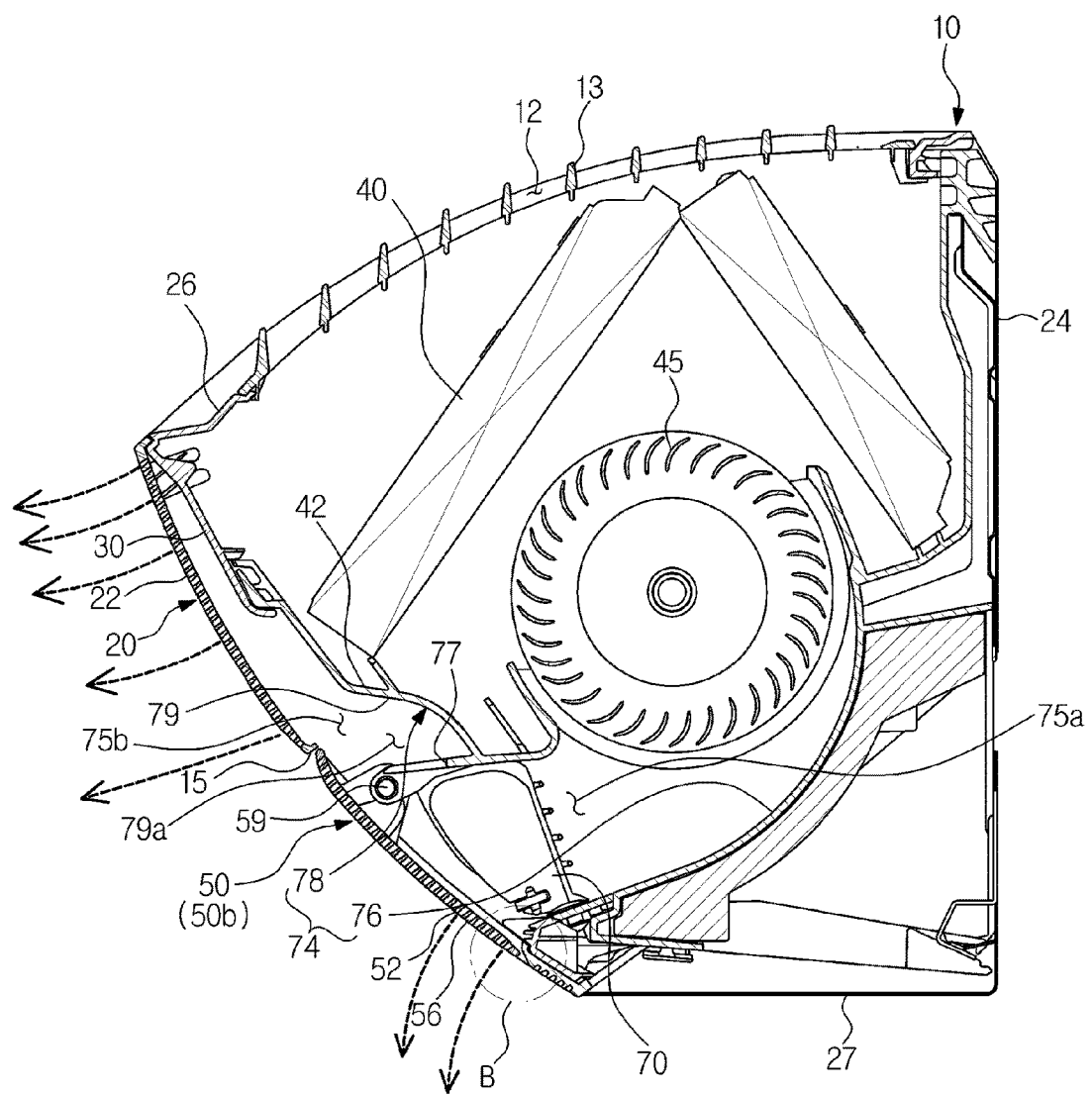
FIG. 4 is a cross-sectional view of the air conditioner.

FIG. 1 is a perspective view illustrating an air conditioner according to an embodiment. FIG. 2 is an enlarged view of a portion A of FIG. 1. FIG. 3 is a front view of the air conditioner. FIG. 4 is a cross-sectional view of the air conditioner.

An air conditioner 1 includes a housing 10 having an inlet 12 and an outlet 14, a heat exchanger 40 configured to exchange heat with air introduced into the housing 10, and a blower fan 45 configured to circulate air into or out of the housing 10.

The air conditioner 1 according to an exemplary embodiment is a wall-mounted air conditioner, without being limited thereto.

The housing 10 may be configured to define the entire appearance of the air conditioner 1. The housing 10 may include a discharge plate 20 having a plurality of discharge holes 22. The plurality of discharge holes 22 may be distinguished from the outlet 14. The plurality of discharge holes 22 may be distributed in the discharge plate 20 as illustrated in FIG. 2 and have a width less than that of the outlet 14. Also, air flowing in a second flow path 75b, which will be described later, may be discharged out of the housing 10 through the plurality of discharge holes 22. The plurality of discharge holes 22 may be distributed to be spaced apart from each other as illustrated in FIG. 2. However, the present embodiment is not limited thereto, and the plurality of discharge holes 22 may be concentrated in a given region of the discharge plate 20. Air may be discharged out of the housing 10 at a low speed via the plurality of discharge holes 22 and a plurality of blade holes 56, which will be described later. Thus, the user may feel more satisfied via air conditioning without direct contact with cool air.

The housing 10 may include a front panel having the outlet 14 defined by an outlet forming part 15, a rear panel 24 disposed behind the front panel, a pair of side panels 25 disposed between the front panel and the rear panel 24, an upper panel 26 having the inlet 12 and disposed on the side panels 25, and a lower panel 27 disposed under the side panels 25. The outlet 14 and the inlet 12 formed in the front panel and the upper panel 26, respectively, will be described by way of example, without being limited thereto. The front panel may have the same configuration as that of the discharge plate 20 described above. The upper panel 26 may have an inlet guide 13 that guides air into the inlet 12. A plurality of inlet guides 13 may be arranged along a lengthwise direction of the housing 10.

The air conditioner 1 may include a discharge blade 50 to open and close the outlet 14. The discharge blade 50 is rotatably installed at the housing 10. Particularly, the discharge blade 50 may be rotated about a blade shaft 59 with respect to the discharge plate 20. The blade shaft 59 may be disposed at an inner surface of the discharge plate 20.

The discharge blade 50 may move between a closed position 50b to close the outlet 14 and a guide position 50a to open the outlet 14 and control a direction of air blown from the blower fan 45 and discharged through the outlet 14. The guide position 50a is a position where the discharge blade 50 opens the outlet 14 to guide the air discharged through the outlet 14 within a predetermined angle range to control the direction of discharged air. The air conditioner 1 may control an air flow from the blower fan 45 to the discharge plate 20 or the outlet 14 as the discharge blade 50 moves between the guide position 50a and the closed position 50b. When the discharge blade 50 is at the guide position 50a, the outlet 14 may be opened simultaneously with the operation of blocking the air flow toward the discharge plate 20. When the discharge blade 50 is at the closed position 50b, the outlet 14 may be closed simultaneously with stopping the operation of blocking the air flow toward the discharge plate 20.

The air conditioner 1 may include an auxiliary blade 70 disposed inside the discharge blade 50 and controlling the direction of air blown from the blower fan 45. The discharge blade 50 controls the air flow in the vertical direction, and the auxiliary blade 70 controls the air flow in the horizontal direction. At least one auxiliary blade 70 may be provided. According to an embodiment, a plurality of auxiliary blades 70 arranged are provided in the horizontal direction to be spaced apart from each other at predetermined intervals. The plurality of auxiliary blades 70 may be arranged along a lengthwise direction of the outlet 14. The auxiliary blades 70 are disposed at inner positions than the discharge blade 50 not to be exposed to the outside while the discharge blade 50 is at the closed position 50b.

Figure 5:
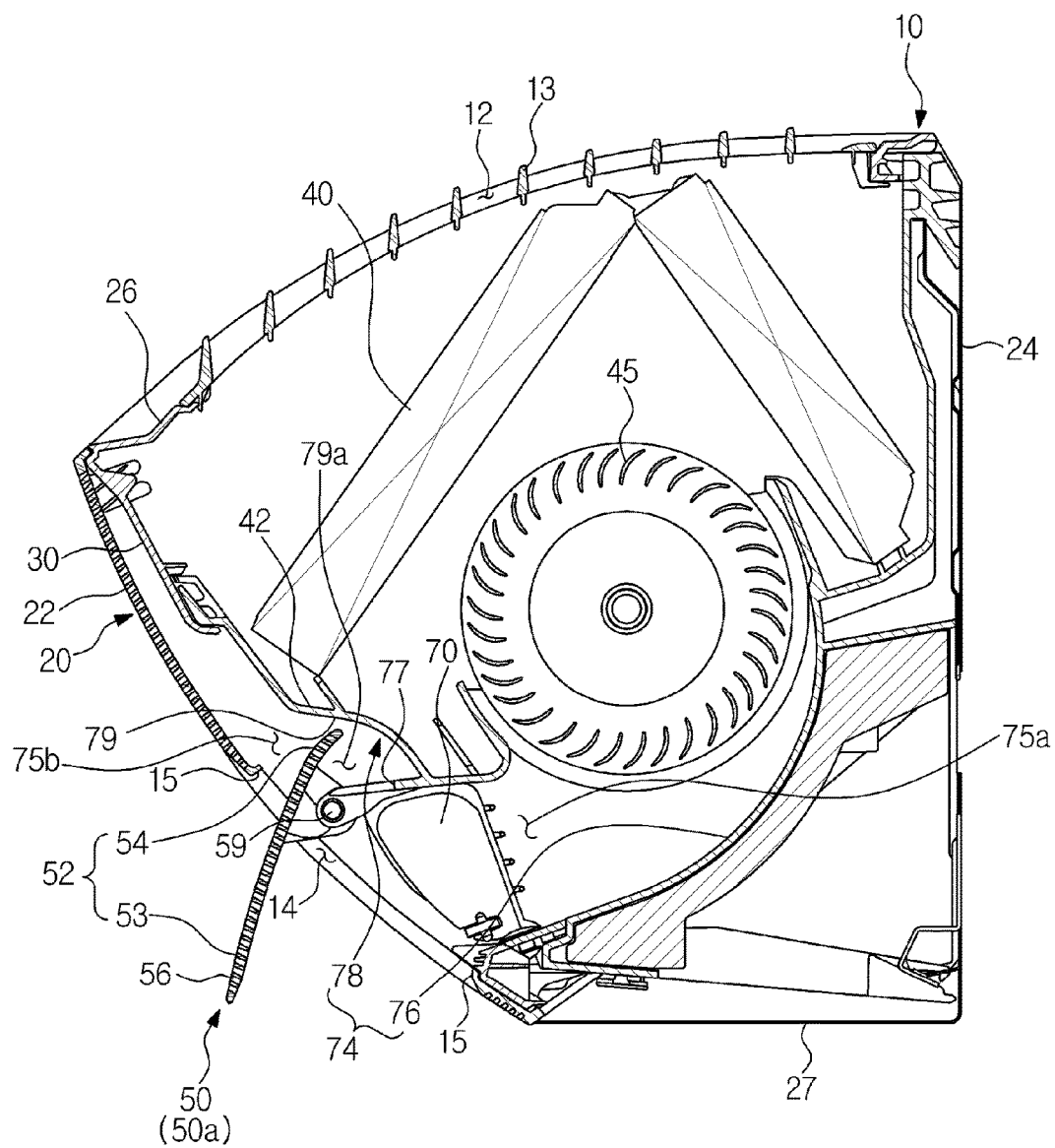
FIGS. 5 and 6 are cross-sectional views of an air conditioner according to an embodiment for describing the operation thereof.

A sensor receiving unit (not shown) may be disposed at a side of the auxiliary blade 70. When the discharge blade 50 is at the closed position 50b, the sensor receiving unit may be covered by the discharge blade 50. Even when the sensor receiving unit is covered by the discharge blade 50, a signal is sensed through the plurality of discharge holes 22 formed in the discharge blade 50 and transmitted to the controller 100 (FIG. 5). Thus, the air conditioner 1 may perform the operation.

Figure 6:
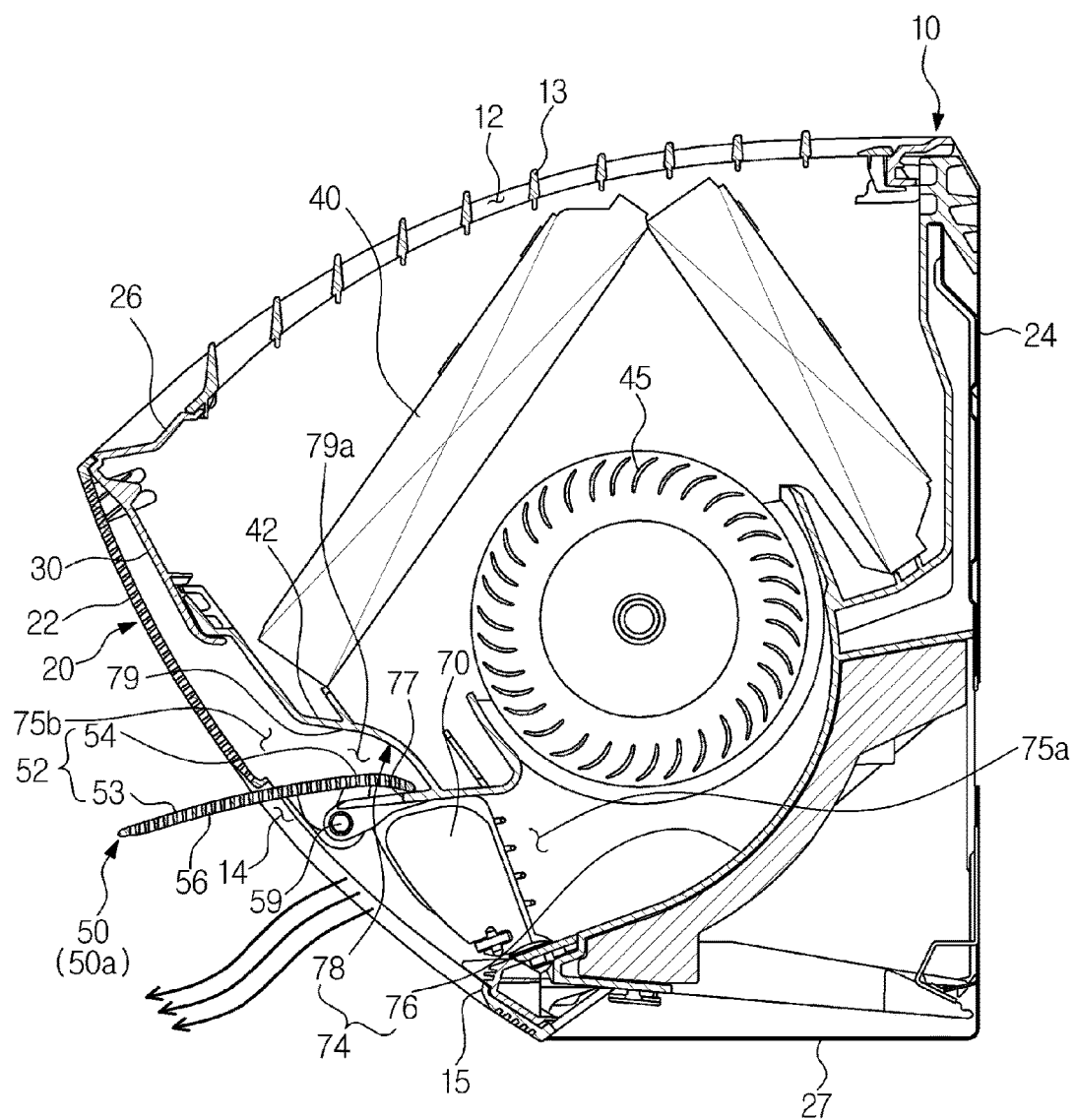

FIGS. 5 and 6 are cross-sectional views of an air conditioner according to an embodiment for describing the operation thereof.

The operation of the air conditioner 1 illustrated in FIGS. 5 and 6 will be described with reference to FIG. 4.

The heat exchanger 40 may be disposed inside the housing 10 on the air flow from the inlet 12 to the outlet 14. The heat exchanger 40 may absorb heat from air introduced through the inlet 12 or transmit heat to the air. A drain panel 42 may be disposed under the heat exchanger 40 such that water condensed on the heat exchanger 40 is collected. Although not shown herein, the drain panel 42 may be connected to a drain hose extending to the outside to drain condensed water out of the housing 10.

The blower fan 45 is disposed in the housing 10. The blower fan 45 is configured to blow air to the outlet 14 and the discharge plate 20 from the inlet 12. The blower fan 45 may be a crossflow fan having the same lengthwise direction as that of the housing 10.

The air conditioner 1 may include a flow guide 74. The flow guide 74 is configured to guide the air blown from the blower fan 45.

The flow guide 74 may include a first flow guide 76 and a second flow guide 78.

The first flow guide 76 forms a first flow path 75a through which air flows from the blower fan 45 to the outlet 14. The first flow path 75a may be connected to the outlet 14. The outlet 14 may be disposed at one end of the first flow guide 76. The outlet 14 may be located at a position extending from an air path guided by the first flow guide 76.

The second flow guide 78 forms the second flow path 75b. The second flow path 75b may be connected to the plurality of discharge holes 22. Particularly, the second flow path 75b is formed between the second flow guide 78 and an inner surface of the discharge plate 20, and air flowing through the second flow path 75b may be discharged out of the housing 10 through the plurality of discharge holes 22 of the discharge plate 20. The second flow path 75b branches from the first flow path 75a, and air flows through the plurality of discharge holes 22. The first flow guide 76 has a guide opening 77 such that air flowing through the first flow path 75a is introduced into the second flow path 75b. The drain panel 42 may be provided at a rear surface of the second flow guide 78 as described above.

The second flow guide 78 may have a curved guide 79. The curved guide 79 may have a curved surface for rotation of the discharge blade 50. The curved guide 79 may form a rotation space 79a of the flow path door portion 54 of the discharge blade 50 which will be described later. The rotation space 79a is a space constituting a portion of the second flow path 75b and used for rotation of the flow path door portion 54. The rotation space 79a formed inside the curved guide 79 allows the discharge blade 50 to rotate without interference from the curved guide 79.

The discharge blade 50 rotatably moves between the guide position 50a and the closed position 50b. The discharge blade 50 may operate to selectively block the first flow path 75a or the second flow path 75b. The discharge blade 50 may close the outlet 14 at the closed position 50b. Also, the discharge blade 50 covers the sensor receiving unit 72 at the closed position 50b such that the internal structure of the housing 10 is not exposed to the outside.

The discharge blade 50 may have a blade body 52 and the plurality of blade holes 56.

The blade body 52 may be formed to be rotatable about the blade shaft 59. The blade body 52 may be configured to correspond to the outlet 14. The blade body 52 may have a plate-like shape. The plurality of blade holes may be distributed in the blade body 52 to have a width smaller than that of the outlet 14. In addition, even when the discharge blade 50 is located at the closed position 50b, air may be discharged out of the housing 10 through the plurality of blade holes 56 of the discharge blade 50. The plurality of blade holes 56 and the plurality of discharge holes 22 of the discharge plate 20 may be formed to have the same size or shape or different sizes or shapes.

The blade body 52 may include a guide portion 53 and a flow path door portion 54. The guide portion 53 and the flow path door portion 54 may be integrally formed.

The guide portion 53 controls the direction of air blown from the blower fan 45 to be discharged through the outlet 14 when the discharge blade 50 is at the guide position 50a. The guide portion 53 may change the direction of the air discharged out of the housing 10 in accordance with a rotation angle thereof with respect to the blade shaft 59.

The flow path door portion 54 extends from the guide portion 53 to block the air flow through the second flow path 75b at the guide position 50a. The flow path door portion 54 moves in the rotation space 79a formed by the curved guide 79 when the discharge blade 50 is at the guide position 50a. That is, when the discharge blade 50 is at the guide position 50a, the flow path door portion 54 blocks the second flow path 75b. At the guide position 50a, the guide portion 53 moves toward the outside of the housing 10, and relatively the flow path door portion 54 moves toward the inside of the housing 10.

Hereinafter, the operation of the air conditioner according to an embodiment will be described with reference to FIGS. 4 to 6.

First, a case in which the discharge blade 50 is located at the closed position 50b will be described.

When the discharge blade 50 is at the closed position 50b as illustrated in FIG. 4, the outlet 14 is closed by the discharge blade 50 and the second flow path 75b is opened. Thus, air blown from the blower fan 45 flows through the first and second flow paths 75a and 75b and is discharged out of the housing 10 through the plurality of discharge holes 22 of the discharge plate 20 and the plurality of blade holes 56 of the discharge blade 50.

In the case where air is discharged out of the housing 10 through the discharge holes 22 and the blade holes 56, a speed of the discharged air may decrease while passing through the plurality of holes formed in the discharge plate 20 and the discharge blade 50. Thus, air may be discharged outward at a low wind speed. Therefore, an indoor space may be heated or cooled with a wind speed providing a pleasant environment to the user.

Next, a case in which the discharge blade 50 is located at the guide position 50a will be described.

When the discharge blade 50 is at the guide position 50a as illustrated in FIGS. 5 and 6, the outlet 14 is opened and the second flow path 75b is closed by the flow path door portion 54. That is, air blown from the blower fan 45 flows only through the first flow path 75a.

Thus, air blown from the blower fan 45 flows through the first flow path 75a to be discharged out of the housing 10 through the outlet 14.

Figure 7:
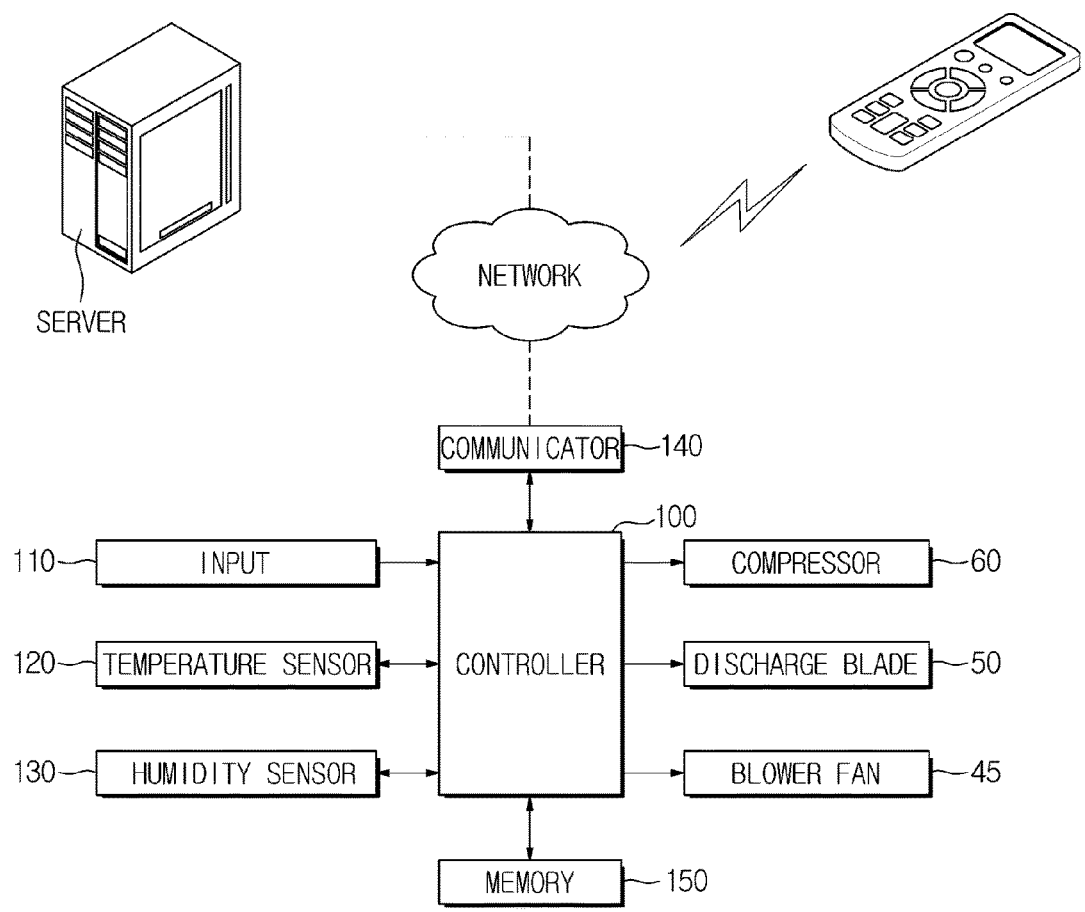
FIG. 7 is a control block diagram of an air conditioner according to an embodiment.

FIG. 7 is a control block diagram of an air conditioner according to an embodiment.

As illustrated in FIG. 7, the air conditioner 1 according to an embodiment may include a controller 100 configured to control the operation of the air conditioner 1, an input 110 configured to receive a control command regarding the operation of the air conditioner 1 or data required to operate the air conditioner 1 from the user, a temperature sensor 120 configured to detect temperature of a room in which the air conditioner 1 is located, a humidity sensor 130 configured to detect humidity of the room in which the air conditioner 1 is located, a communicator 140 configured to receive and transmit data related to the operation of the air conditioner 1 from and to an external server, and a memory 150 configured to store programs and data related to the operation of the air conditioner 1.

The input 110 may include a button-type switch, a membrane switch, or a touch panel to receive an operation command to operate the air conditioner 1. However, since the input 110 may include a remote controller (not shown) that receives a command to operate or run the air conditioner 1 and displays operation information of the air conditioner 1, the input 110 of the air conditioner 1 may include only a power button (not shown) to supply power to the air conditioner 1.

The input 110 is used to input an operation mode desired by the user (e.g., wind speed or wind volume mode such as high, medium, low, and turbo, automatic or manual mode, and functional mode such as cooling mode, dehumidification mode, fan mode, heating mode, and comfort control mode), operation start or stop, desired temperature, wind direction, and the like. The input 110 may include a plurality of keys of the housing 10 of the air conditioner 1 or the remote control for data input. Also, the input 110 may receive information about at least one of indoor temperature and indoor humidity of a region in which the air conditioner 1 is located from the user.

That is, the user may set a desired temperature and a desired humidity of an indoor space in which the air conditioner 1 is located via the input 110. If the indoor temperature or indoor humidity is changed by operating the air conditioner 1, the user may set a new desired temperature or desired humidity via the input 110.

Also, the input 110 may receive data about an operation cycle, an operation configuration, an operation time, and the like for a cooling operation through the outlet 14 of the air conditioner 1 and a cooling operation through the discharge holes 22 and the blade holes 56.

The controller 100 may be electrically connected to the input 110, the temperature sensor 120, the humidity sensor 130, and the memory 150 to transmit and receive commands and data related to the overall operation of the air conditioner 1. An output device of the controller 100 may be electrically connected to the blower fan 45 and the discharge blade 50 to control heat-exchanged air discharged out of the air conditioner 1.

That is, the controller 100 may control a driving motor (not shown) connected to the blower fan 45 to control On/Off operation and rotation speed of the blower fan 45. The controller 100 may transmit control commands to the driving motor (not shown) to respectively control the On/Off operation and rotation speed of the blower fan 45 corresponding to an operation mode selected by the user.

Also, the controller 100 may control the discharge blade 50 to open or close the outlet 14.

The controller 100 may determine opening and closing of the outlet 14 by comparing an indoor temperature sensed by the temperature sensor 120 with a desired temperature received from the user and stored therein and comparing an indoor humidity sensed by the humidity sensor 130 with a desired humidity received from the user and stored therein.

Also, the controller 100 may control the rotation speed of the blower fan 45 based on a current indoor temperature or humidity sensed by the temperature sensor 120 or the humidity sensor 130. In this case, the controller 100 may also consider information about a wind speed more or wind volume mode input by the user in addition to the current indoor temperature or humidity.

First, if the sensed current indoor temperature or humidity is less than the desired temperature or desired humidity input by the user, the controller 100 may control the rotation speed of the blower fan 45 to be lower than the current rotation speed of the indoor fan. As described above, the controller 100 may further consider the current wind speed mode or wind volume mode in addition to the sensed current indoor temperature or humidity to control the rotation speed of the blower fan 45. In this case, a reference of the rotation speed of the blower fan 45 refers to, for example, a rotation speed of the blower fan 45 which matches with each of the current wind speed mode and the current indoor temperature and previously stored. The controller 100 may extract the rotation speed of the blower fan 45 matching with the sensed current indoor temperature and current wind speed mode and transmit a control signal to the driving motor (not shown). For example, when the current wind speed mode is a breeze mode in which the rotation speed is the lowest, the controller 100 may transmit a control signal to reduce the rotation speed of the blower fan 45 to be lower than the current rotation speed to the driving motor. In this regard, the breeze mode refers to the lowest rotation speed of the blower fan 45 among the wind speed modes set by the user. If the indoor temperature or indoor humidity sensed respectively by the temperature sensor 120 and the humidity sensor 130 is lower than a desired temperature or a desired humidity, the controller 100 may variably control the rotation speed of the blower fan 45 to be lower than the lowest rotation speed.

Also, the controller 100 may change the amount of the refrigerant of the air conditioner 1 by modifying the frequency of the compressor based on the indoor temperature or the indoor humidity sensed by the temperature sensor 120 and the humidity sensor 130.

The controller 100 may include a single general-purpose processor that performs all computations related to the operation of the air conditioner 1 or a processor that performs specified computations such as a communication processor performing computations related only to communications and a control processor performing computations related only to control operations.

The air conditioner 1 may include the temperature sensor 120 configured to sense indoor temperature of a region in which the air conditioner 1 is located and the humidity sensor 130 configured to sense indoor humidity.

The temperature sensor 120 may sense temperature of an indoor space in which the air conditioner 1 is located and output an electric signal corresponding to the sensed temperature. Also, the temperature sensor 120 may further include a suction temperature sensor to sense the temperature of indoor air sucked into the air conditioner 1 or a discharge temperature sensor to sense the temperature of air discharged from the air conditioner 1. However, the present embodiment is not limited thereto, and the temperature sensor 120 may be disposed at any positions allowing sensing of the indoor temperature. The temperature sensor 120 may include a thermistor whose electrical resistance varies with temperature.

The humidity sensor 130 may sense humidity of an indoor space in which the air conditioner 1 is located and output an electric signal corresponding to the sensed humidity. Also, the humidity sensor 130 may acquire information about relative humidity by sensing humidity of the indoor space. The humidity sensor 130 may also be disposed at any positions of the air conditioner 1 allowing sensing of the indoor humidity.

The communicator 140 may transmit and receive various data related to the operation and control of the air conditioner 1 from and to the external server via a network. That is, in addition to directly inputting commands to operate and control the air conditioner 1 via the input 110 by the user, the communicator 140 may also receive information about commands to operate and control the air conditioner 1 from the external server.

Also, the communicator 140 may receive data, which may be input by the user to prevent condensation in the air conditioner 1 according to an embodiment, from the external server and receive periodically updated data applicable to the control of the air conditioner 1.

Also, various data stored in the memory 150 may be stored in the external server via the communicator 140.

The memory 150 that stores various data related to the operation and control of the air conditioner 1 may store data for various settings for the operation mode desired by the user (e.g., wind speed or wind volume mode such as high, medium, low, and turbo, automatic or manual mode, and functional mode such as cooling mode, dehumidification mode, fan mode, heating mode, and comfort control mode) operation start or stop, desired temperature, wind direction, and the like. Also, the memory 150 may store information about at least one of a desired temperature and a desired humidity of a room in which the air conditioner 1 is located received from the user. The memory 150 may include not only a non-volatile memory such as a magnetic disk or a semiconductor disk to permanently store programs and data related to the operation of the air conditioner 1, but also a volatile memory (not shown) such as D-RAM or S-RAM to temporarily store temporary data generated during the operation of the air conditioner 1.

Hereinafter, the operation of the air conditioner 1 according to an embodiment and a method of controlling the air conditioner 1 will be described with reference to FIGS. 8 to 14.

Figure 8:
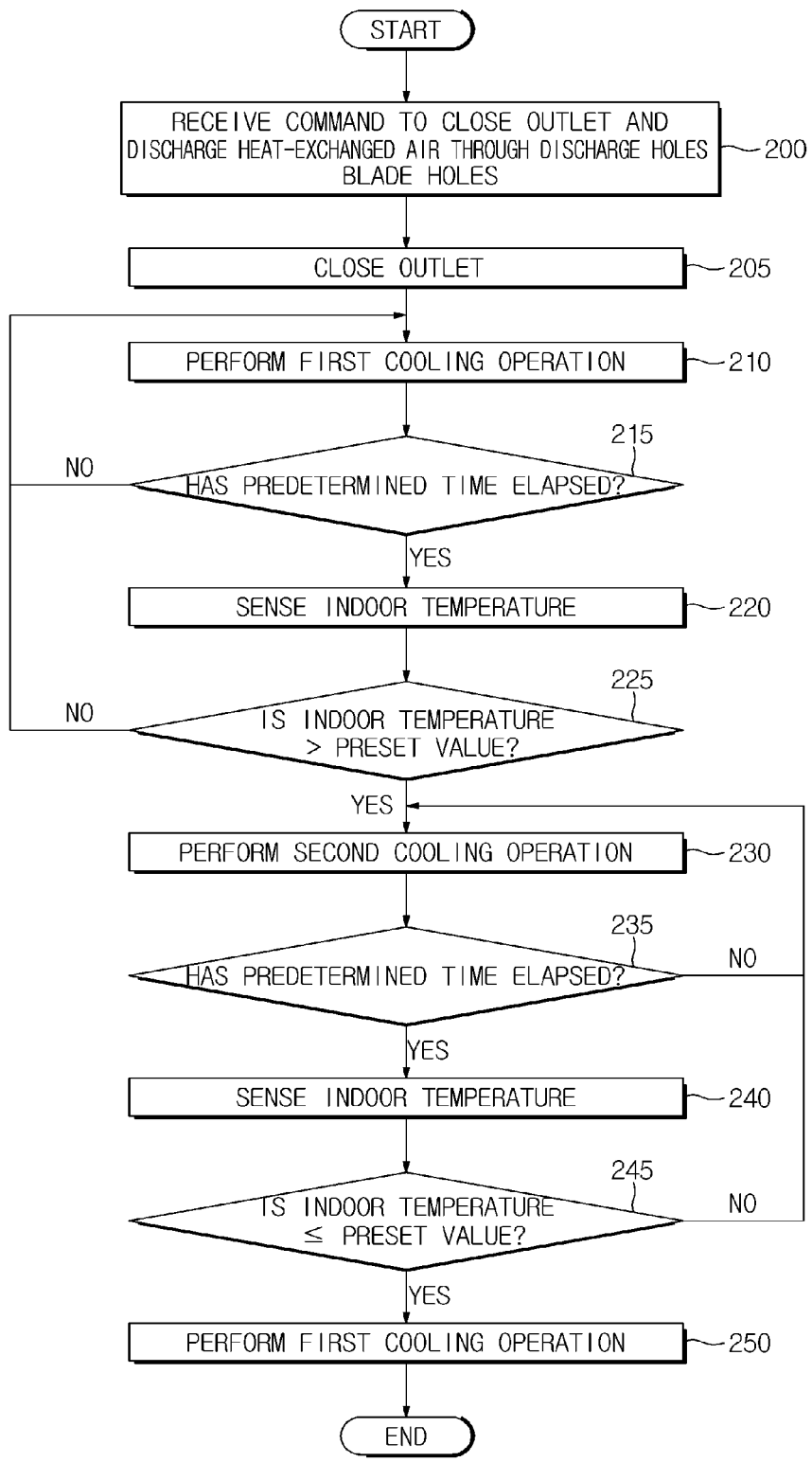
FIG. 8 is a flowchart of a method of controlling an air conditioner to change a cooling operation mode by sensing an indoor temperature according to an embodiment.

FIG. 8 is a flowchart of a method of controlling an air conditioner to change a cooling operation mode by sensing an indoor temperature according to an embodiment.

When the discharge blade 50 of the air conditioner 1 is located at the guide position 50a, the outlet 14 is opened and heat-exchanged air is discharged out of the housing 10 through the outlet 14 as described above. That is, when air is discharged through the outlet 14, the cooling capability of the air conditioner 1 may be enhanced efficiently decreasing the indoor temperature within a short period of time. However, to prevent direct contact with cool air discharged through the outlet 14, the user may input a control command to the air conditioner 1 via the input 110 to perform the cooling operation through the discharge holes 22 and the blade holes 56 instead of the outlet 14.

That is, the user may input a control command to close the outlet 14 of the air conditioner 1 and discharge heat-exchanged air through the discharge holes 22 and the blade holes 56 by controlling the input 110 or the remote control. The controller 100 may receive the input command (200).

The controller 100 may close the outlet 14 by controlling the discharge blade 50 to move to the closed position 50b (205). If the outlet 14 is closed, air blown from the blower fan 45 may flow through the first and second flow paths 75a and 75b to be discharged out of the housing 10 through the plurality of discharge holes 22 of the discharge plate 20 and the plurality of blade holes 56 of the discharge blade 50.

That is, the controller 100 controls heat-exchanged air to be discharged through the discharge holes 22 and the blade holes 56 based on a predetermined frequency of the compressor 60 and a predetermined rotation speed of the blower fan 45. A cooling operation of the air conditioner 1 performed thereby will be referred to as 'first cooling operation'.

The controller 100 may control the air conditioner 1 to perform the first cooling operation (210). The first cooling operation is performed according to the predetermined frequency of the compressor 60 and the predetermined rotation speed of the blower fan 45.

For example, the frequency of the compressor 60 and the rotation speed of the blower fan 45 for the first cooling operation may be set as values to maintain the indoor temperature in the range of 24° C. to 25° C. and stored in the memory 150. When the first cooling operation is started after closing the outlet 14 of the air conditioner 1, the controller 100 may control the compressor 60 and the blower fan 45 based on the preset frequency and rotation speed values.

During the first cooling operation, the controller 100 may determine whether a predetermined time has elapsed (215). After the predetermined time elapses from the start of the first cooling operation, the temperature sensor 120 may detect the indoor temperature (220).

The controller 100 may compare the current indoor temperature sensed by the temperature sensor 120 with a value previously stored in the memory 150 (225). If the indoor temperature is higher than the predetermined value, the air conditioner 1 may perform a second cooling operation in which a frequency of the compressor 60 and a rotation speed of the blower fan 45 are greater than those of the first cooling operation (230).

That is, when the first cooling operation in which the outlet 14 of the air conditioner 1 is closed and heat-exchanged air is discharged through the discharge holes 22 and the blade holes 56 is performed, the indoor temperature should be maintained at a preset value via cooling based on the predetermined frequency of the compressor 60 and the predetermined rotation speed of the blower fan 45. However, the indoor temperature cannot be maintained at the preset value or does not decrease due to any other loads in the room or the like. In this case, the controller 100 may send out a control signal to convert the operation of the air conditioner 1 into the second cooling operation.

On the contrary, when the current indoor temperature sensed by the temperature sensor 120 is lower than the predetermined value, the controller 100 may control the air conditioner 1 to maintain the first cooling operation.

The second cooling operation has greater cooling capability than the first cooling operation since the frequency of the compressor 60 of the second cooling operation is higher than that of the first cooling operation and the rotation speed of the blower fan 45 of the second cooling operation is faster than that of the first cooling operation.

Data about the frequency of the compressor 60 and the rotation speed of the blower fan 45 for the second cooling operation may be prestored in the memory 150. When the second cooling operation is performed, the indoor temperature may decrease within a short period of time in comparison with the first cooling operation.

The controller 100 may determine whether a predetermined time has elapsed from the start of the second cooling operation (235). Upon determination that the predetermined time has elapsed, the temperature sensor 120 may detect the indoor temperature (240).

The controller 100 may determine whether a current indoor temperature is lower than the predetermined value based on a result sensed by the temperature sensor 120 (245). Upon determination that the current indoor temperature is lower than the predetermined value, the controller 100 may reduce the frequency of the compressor 60 and the rotation speed of the blower fan 45 to perform the first cooling operation (250).

In this regard, the predetermined value is a temperature to maintain the indoor temperature via the first cooling operation. When the indoor temperature becomes lower than the predetermined value via the second cooling operation, the second cooling operation may be stopped and the first cooling operation may be performed to provide a pleasant indoor temperature.

Thus, the air conditioner 1 according to an embodiment may change a cooling operation mode under the control of the controller 100 by periodically monitoring the indoor temperature and controlling the frequency of the compressor 60 and the rotation speed of the blower fan 45 in accordance with a sensing result.

Figure 9:
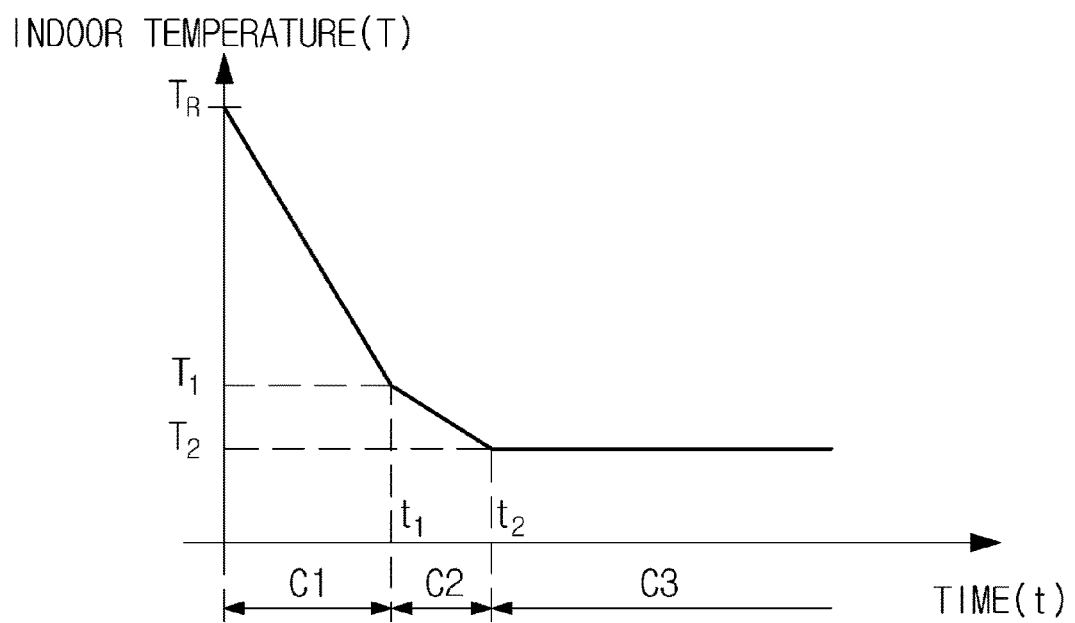
FIG. 9 is a graph illustrating a method of changing an operation mode of an air conditioner according to an embodiment based on a change of indoor temperature.
Figure 10:
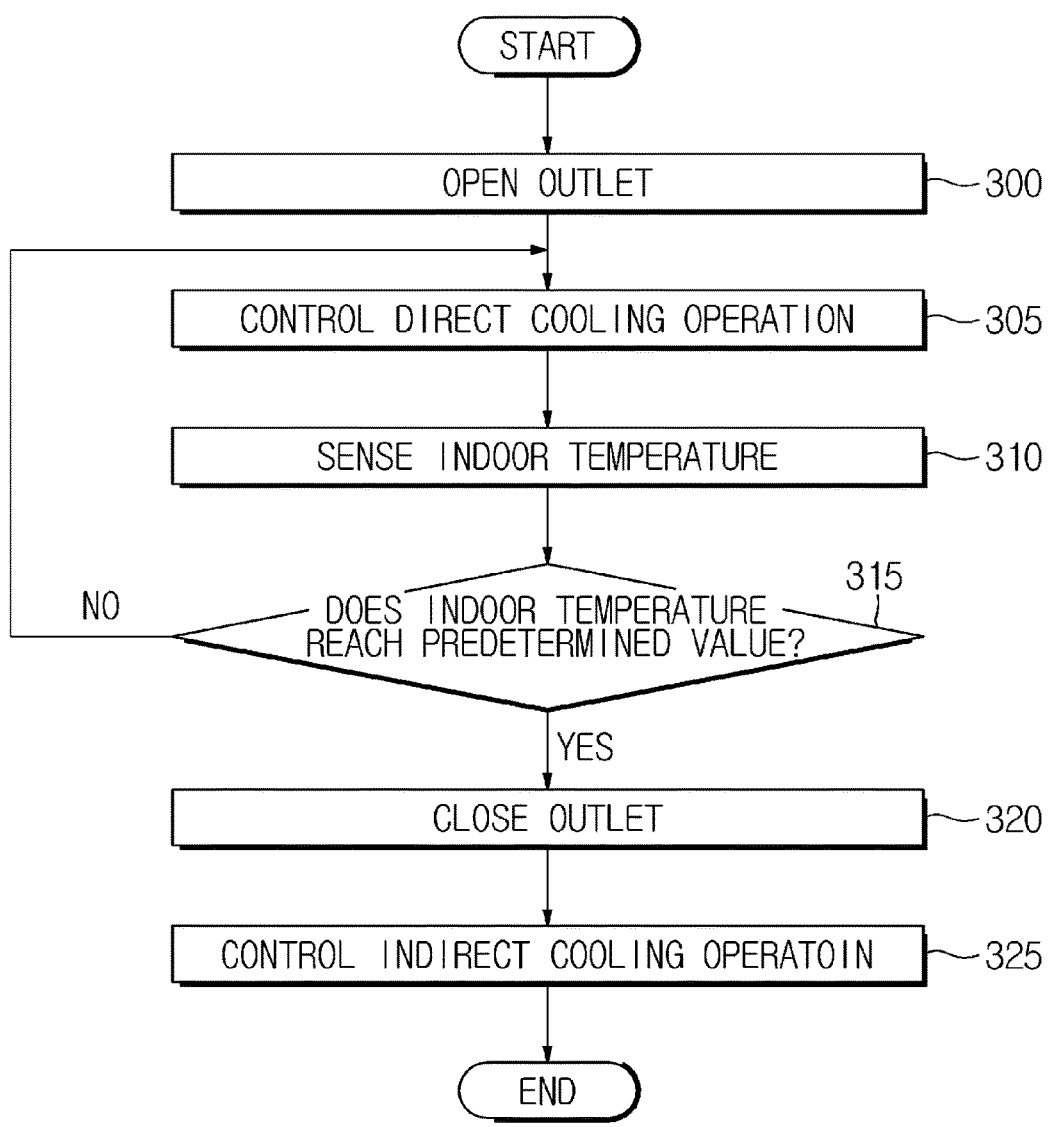
FIGS. 10 and 11 are flowcharts for describing a control method to change the operation mode of the air conditioner.
Figure 11:
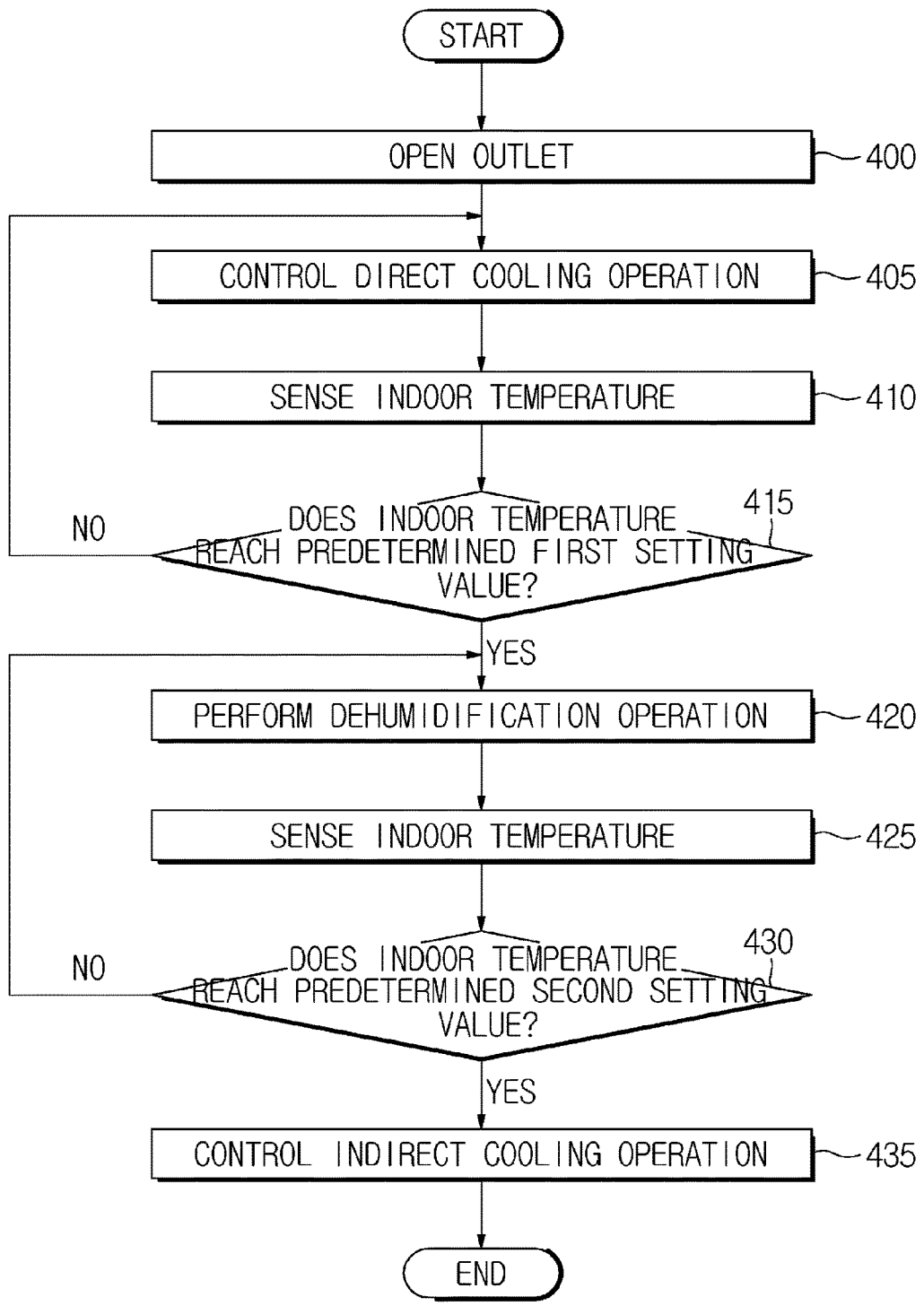

FIG. 9 is a graph illustrating a method of changing an operation mode of an air conditioner according to an embodiment based on a change of indoor temperature. FIGS. 10 and 11 are flowcharts for describing a control method to change the operation mode of the air conditioner.

The operation mode of the air conditioner 1 according to an embodiment may be automatically changed under the control of the controller 100. That is, the user may input information about the operation mode in accordance with the indoor temperature of the air conditioner 1 via the input 110 and information about a desired temperature or a pleasant temperature in a room. The input information may be stored in the memory 150 and used by the controller 10 to control the cooling operation of the air conditioner 1.

Referring to FIG. 9, when the current indoor temperature is $T_R$, the air conditioner 1 may perform a direct cooling operation C1 to open the outlet 14 and discharge heat-exchanged air through the outlet 14. As described above, if the outlet 14 is opened and the heat-exchanged air is discharged through the outlet 14, the indoor temperature may decrease within a relatively short period of time due to improved cooling capability of the air conditioner 1. However, cool air discharged through the outlet 14 may directly contact the user.

The cooling operation to open the outlet 14 and discharge the heat-exchanged air through the outlet 14 will be referred to as the direct cooling operation C1.

When the air conditioner 1 performs the direct cooling operation C1, the indoor temperature may decrease to $T_1$ from $T_R$. The controller 100 may control the direct cooling operation C1 of the air conditioner 1 to decrease the current indoor temperature to $T_1$. Although FIG. 9 illustrates a graph of temperature with respect to time as a line for descriptive convenience, the shape of the graph is not limited thereto so long as the graph illustrates changes of the indoor temperature, and the temperature change may be expressed as a curve due to any other loads or external factors.

When the indoor temperature reaches $T_1$, the controller 100 may control the air conditioner 1 to perform a dehumidification operation C2. The dehumidification operation C2 of the air conditioner 1 may be added or excluded in accordance with user's settings.

When the indoor temperature reaches $T_1$, the controller 100 may decrease the temperature of the heat exchanger 40 below a dew point temperature by driving the compressor 60 to perform dehumidification. The controller 100 may determine whether the temperature of the heat exchanger 40 is lowered to the dew point temperature or less based on the temperature sensed by an evaporator temperature sensor. A temperature of moisture-containing air introduced through an inlet of the indoor unit may decrease while passing through the heat exchanger 40 cooled below the dew point temperature. When the temperature of air lowers below the dew point temperature, vapor in the air may be converted into water and removed from the air. The dehumidified air is discharged into the room by the blower fan 45. Humidity of the room may be reduced through such a process. The air conditioner 1 may circulate the refrigerant by operating the compressor 60 and drive the blower fan 45 such that the indoor humidity is maintained in a predetermined range to provide a pleasant environment to the user.

Since the dehumidification operation C2 of the air conditioner 1 involves cooling, the indoor temperature may decrease from $T_1$ to $T_2$.

When the indoor temperature reaches $T_2$, the controller 100 may control the air conditioner 1 to perform an indirect cooling operation C3. That is, when the indoor temperature decreases from the initial temperature $T_R$ to $T_2$ via the direct cooling operation C1 and the dehumidification operation C2, the controller 100 may control the discharge blade 50 to be located at the closed position 50b to close the outlet 14 and control the air blown from the blower fan 45 to be discharged out of the housing 10 through the plurality of discharge holes 22 and the plurality of blade holes 56.

Hereinafter, a cooling operation to close the outlet 14 and discharge the heat-exchanged air through the discharge holes 22 and the blade holes 56 will be referred to as the 'indirect cooling operation C3'.

When the air conditioner 1 performs the indirect cooling operation C3, the wind speed of the heat-exchanged air decreases while passing through the discharge holes 22 and the blade holes 56 so that the heat-exchanged air is discharged at a low wind speed. That is, since the cooling capability of the indirect cooling operation C3 is less than that of the operation of discharging air through the open outlet 14, the indoor temperature may be maintained at $T_2$ that is the initial temperature of the indirect cooling operation C3. Thus, this cooling operation may provide a pleasant indoor temperature to the user with no direct contact with cool air.

Although not shown in FIG. 9, while the air conditioner 1 performs the cooling operation, the temperature sensor 120 may sense the indoor temperature in real time or at predetermined intervals, and the controller 100 may determine whether to change the cooling operation of the air conditioner 1 by comparing the sensed temperature with a preset value.

That is, if the indoor temperature sensed by the temperature sensor 120 while the air conditioner 1 performs the indirect cooling operation C3 is higher than the predetermined value, the controller 100 controls the discharge blade 50 to open the outlet 14 such that the heat-exchanged air is discharged through the outlet 14. The air conditioner 1 may perform the direct cooling operation C1 under the control of the controller 100.

The controller 100 may change the cooling operation of the air conditioner 1 based on the indoor temperature sensed by the temperature sensor 120 during the cooling operation of the air conditioner 1 to pleasantly maintain the indoor temperature at the present value.

Referring to FIG. 10, the controller 100 may control the discharge blade 50 to be located at the guide position 50a to open the outlet 14 (300). When the outlet 14 is opened, the air conditioner 1 may perform the direct cooling operation to discharge the heat-exchanged air out of the housing 10 through the outlet 14 under the control of the controller 100 (305).

When the direct cooling operation of the air conditioner 1 is performed, the indoor temperature becomes lower than a temperature at the time when the direct cooling operation is started and the temperature sensor 120 may sense the indoor temperature (310). The controller 100 may determine whether the indoor temperature sensed by the temperature sensor 120 reaches the preset value (315).

When the indoor temperature reaches the preset value, the controller 100 may control the discharge blade 50 to close the outlet 14 (320).

When the outlet 14 is closed, the air conditioner 1 may perform the indirect cooling operation to discharge the heat-exchanged air out of the housing 10 through the discharge holes 22 and the blade holes 56 under the control of the controller 100 (325). When the indirect cooling operation is performed, the indoor temperature may be maintained at a predetermined value providing a pleasant environment to the user while preventing direct contact between the heat-exchanged air and the user.

Referring to FIG. 11, the controller 100 may open the outlet 14 by controlling the discharge blade 50 to be located at the guide position 50a (400). When the outlet 14 is opened, the air conditioner 1 may perform the direct cooling operation to discharge the heat-exchanged air out of the housing 10 through the outlet 14 under the control of the controller 100 (405).

When the direct cooling operation of the air conditioner 1 is performed, the indoor temperature becomes lower than a temperature at the time when the direct cooling operation is started and the temperature sensor 120 may sense the indoor temperature (410).

The controller 100 may determine whether the indoor temperature sensed by the temperature sensor 120 reaches a predetermined first setting value (415). Upon determination that the indoor temperature reaches the first setting value, the controller 100 may control the air conditioner 1 to perform a dehumidification operation (420). On the contrary, if the indoor temperature does not reach the first setting value, the air conditioner 1 keeps performing the direct cooling operation.

In this regard, the predetermined first setting value corresponds to the temperature $T_1$ described above with reference FIG. 9, and the first setting value may be previously set by the user and stored in the memory 150.

Since the dehumidification operation of the air conditioner 1 removes vapor from the air and involves cooling resulting in decrease in the indoor temperature, the temperature sensor 120 may sense the indoor temperature during the dehumidification operation (425).

The controller 100 may determine whether the indoor temperature sensed by the temperature sensor 120 reaches a predetermined second setting value (430). Upon determination that the indoor temperature reaches the second setting value, the controller 100 may control the air conditioner 1 to perform an indirect cooling operation (435). On the contrary, if the indoor temperature does not reach the second setting value, the air conditioner 1 keeps performing the dehumidification operation.

In this regard, the predetermined second setting value corresponding to the temperature $T_2$ described above with reference FIG. 9, and the second setting value may be previously set by the user and stored in the memory 150.

When the indirect cooling operation of the air conditioner 1 is performed, the speed of heat-exchanged air decreases while passing through the discharge holes 22 and the blade holes 56. Thus, air may be discharged outward at a low wind speed, and the indoor temperature may be maintained at the temperature $T_2$ at the time when the indirect cooling operation is started.

Figure 12:
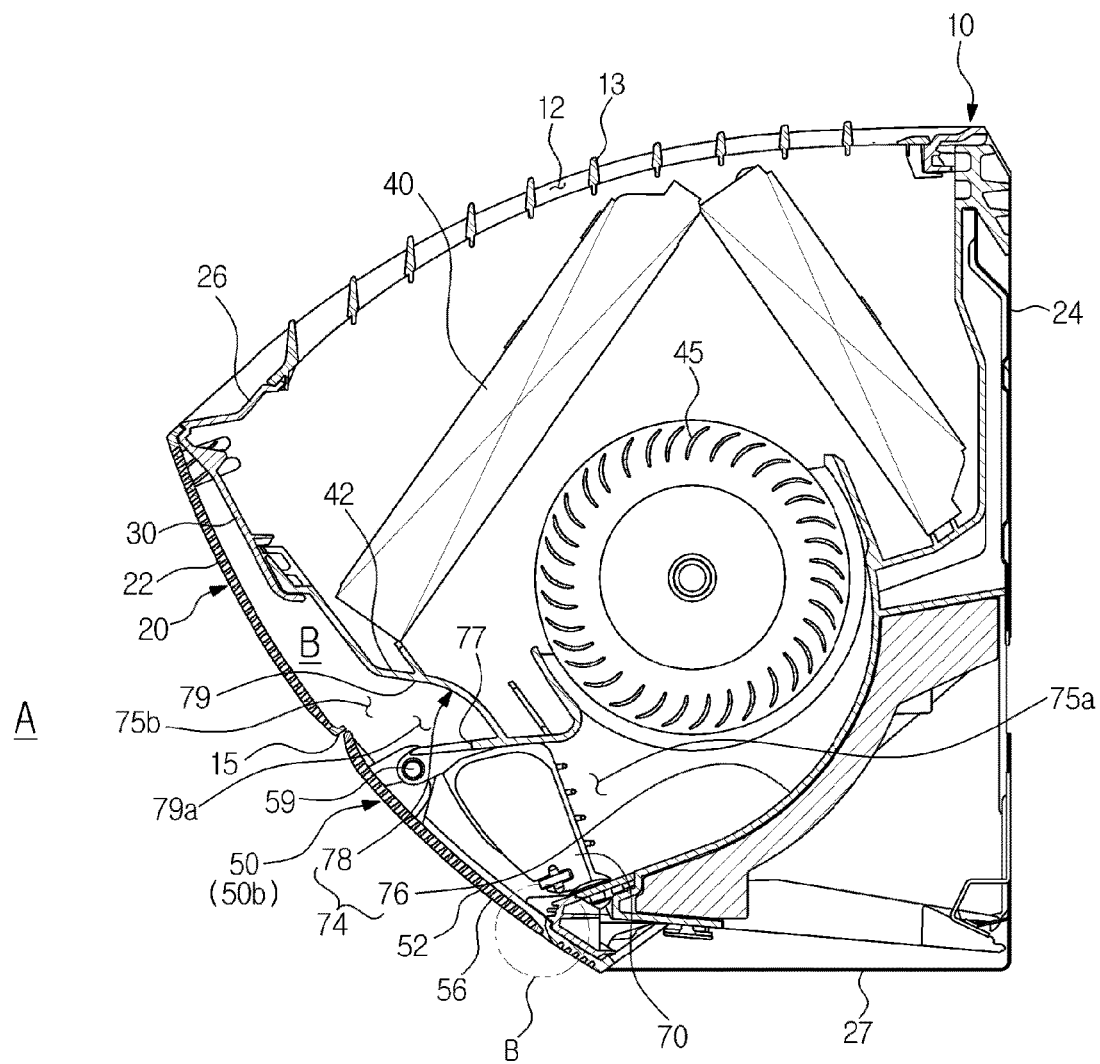
FIG. 12 is a conceptual diagram illustrating the principle of condensation during a cooling operation of an air conditioner.

FIG. 12 is a conceptual diagram illustrating the principle of condensation during a cooling operation of an air conditioner.

When the discharge blade 50 is located at the closed position 50b under the control of the controller 100 as illustrated in FIG. 12, the outlet 14 is closed by the discharge blade 50, and the second flow path 75b is opened. Thus, the heat-exchanged air flows through the first and second flow paths 75a and 75b and is discharged out of the housing 10 through the plurality of discharge holes 22 and the plurality of blade holes 56.

If the heat-exchanged air is discharged through the discharge holes 22 and the blade holes 56, the indoor temperature may be maintained at the preset value, and cool air may be discharged at a low wind speed, thereby providing a pleasant environment to the user.

As cooling progresses as described above, the heat-exchanged cool air is continuously discharged through the discharge holes 22 and the blade holes 56, and thus condensation may occur on the surfaces of the discharge plate 20 and the discharge blade 50 due to a temperature difference between the outside the housing 10 of the air conditioner 1 and the inside of the housing 10.

Condensation is a phenomenon in which vapor contained in the air turns into dew when the air including vapor is cooled below a dew point temperature and may be classified into surface condensation and internal condensation. That is, condensation refers to a phenomenon in which vapor contained in the air liquefies into dew when in contact with a surface of an object as a temperature inside the object becomes below the dew point temperature. In this regard, the dew point temperature refers to a temperature at which the vapor in the air liquefies into dew.

In this case, as the concentration of water vapor contained in the air increases, the rate of condensation increases. A higher relative humidity of a room which indicates a higher concentration of vapor, may cause a higher rate of condensation.

The principle of condensation will be described with reference to FIG. 12. An area outside the housing 10 is referred to as an outer region A and an area inside the housing 10 is referred to as an inner region B. For example, when an indoor temperature of the outer region A of the housing 10 is from 26° C. to 29° C., air adjacent to the discharge plate 20 and the discharge blade 50 may have a temperature of 26° C. to 29° C.

When the heat-exchanged cool air is discharged through the discharge holes 22 and the blade holes 56 during the cooling operation of the air conditioner 1, the cool air may be located in the inner region B of the housing 10. Thus, temperatures of the discharge plate 20 and the discharge blade 50 may be maintained at lower levels than the temperature of indoor air corresponding to the temperature of the heat-exchanged cool air. Thus, if the temperature of the heat-exchanged air is 20° C., the temperatures of the discharge plate 20 and the discharge blade 50 may also be maintained at 20° C.

That is, when the temperature of the discharge plate 20 and the discharge blade 50 is 20° C. and the temperature of air adjacent to the discharge plate 20 and the discharge blade 50 is from 26° C. to 29° C., a dew point temperature at which condensation occurs on the surfaces of the discharge plate 20 and the discharge blade 50 may be approximately set to 23° C.

When indoor air adjacent to the discharge plate 20 and the discharge blade 50 and having a temperature of 26° C. to 29° C. comes into contact with the discharge plate 20 and the discharge blade 50 having a temperature of 20° C., condensation may occur on the surfaces of the discharge plate 20 and the discharge blade 50. This is because the temperature of the discharge plate 20 and the discharge blade 50 is below the dew point temperature of 23° C. Also, a higher relative humidity of the outer region A of the housing 10 may cause a higher rate of condensation.

Condensation occurring as described above may cause structural defects of the air conditioner 1 due to dew formed on the discharge plate 20 and the discharge blade 50.

Thus, the controller 100 of the air conditioner 1 according to an embodiment may control the frequency of the compressor 60 depending on a current indoor relative humidity to provide a method of preventing condensation occurring on the surfaces of the discharge plate 20 and the discharge blade 50.

Figure 13:
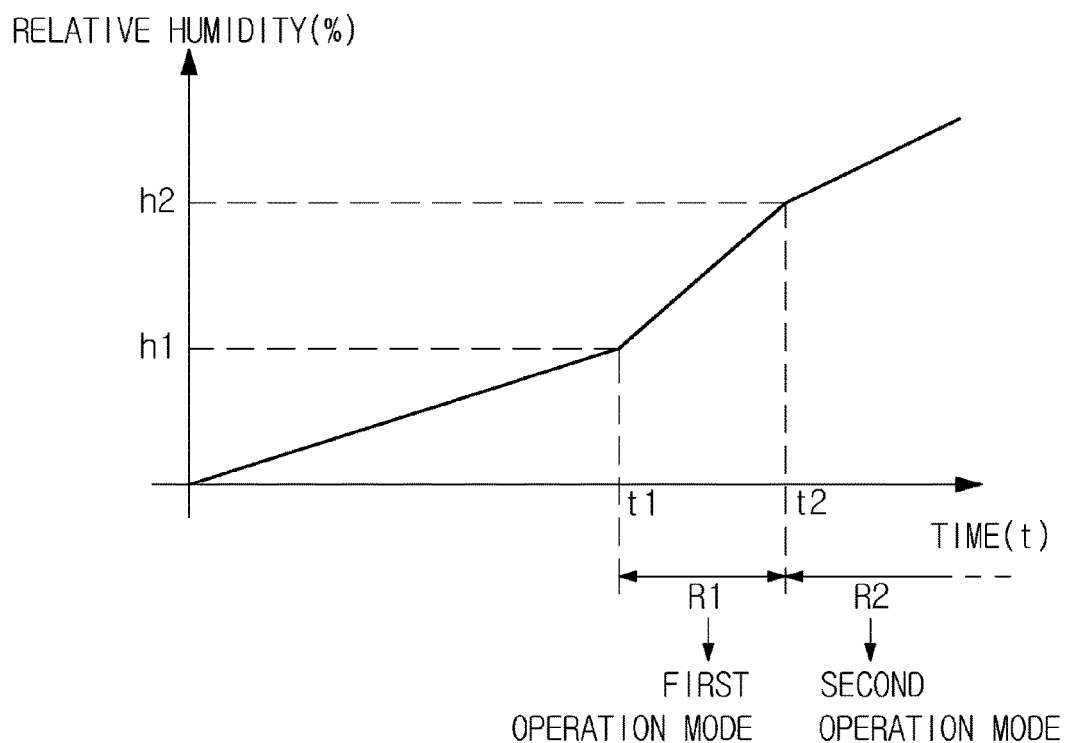
FIG. 13 is a graph illustrating a change of relative humidity in a room during a cooling operation of an air conditioner.
Figure 14:
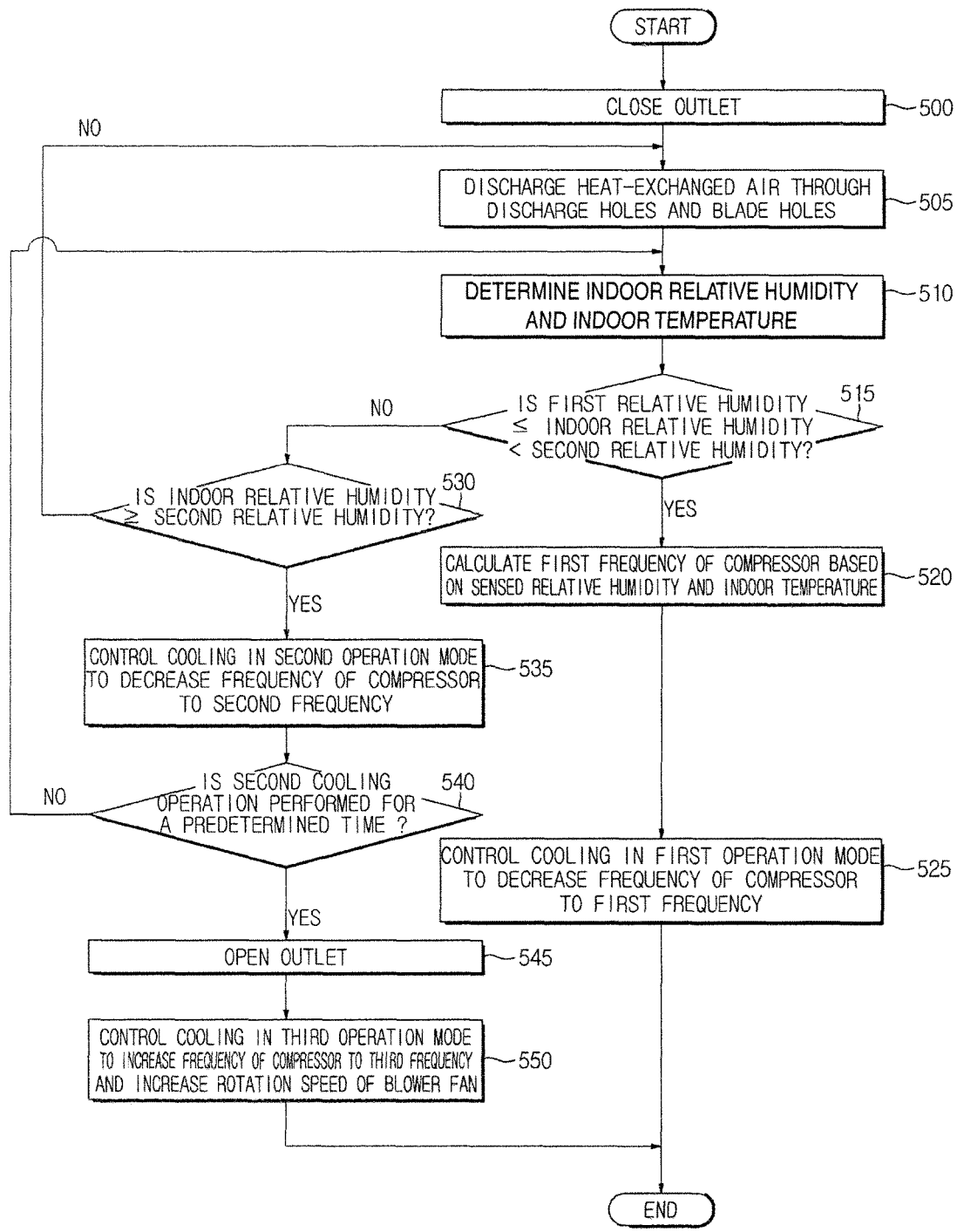
FIG. 14 is a flowchart of a method of preventing condensation of an air conditioner according to an embodiment.

FIG. 13 is a graph illustrating a change of relative humidity in a room during a cooling operation of an air conditioner. FIG. 14 is a flowchart of a method of preventing condensation of an air conditioner according to an embodiment.

As described above with reference to FIG. 12, when the outlet 14 of the air conditioner 1 is closed, a cooling operation to discharge heat-exchanged air out of the housing 10 through the plurality of discharge holes 22 and the plurality of blade holes 56 is performed (505).

Since the indoor temperature and or indoor humidity may vary during the cooling operation of the air conditioner 1, the temperature sensor 120 may sense the indoor temperature in real time and the humidity sensor 130 may sense the indoor humidity in real time to obtain information about relative humidity (510).

After the outlet 14 is closed and the cooling operation to discharge the heat-exchanged air through the discharge holes 22 and the blade holes 56 is started, the relative humidity of the room may increase until $t_1$ as illustrated in FIG. 13. The relative humidity of the room may increase due to various reasons, for example, inflow of external heat load during the cooling operation of the air conditioner 1.

The controller 100 may determine whether the relative humidity of the room sensed by the humidity sensor 130 is within a preset range, particularly, whether a sensed current relative humidity of the room is equal to or higher than a preset first relative humidity h1 and lower than a preset second relative humidity h2 (515).

In this case, the second relative humidity h2 is higher than the first relative humidity h1 as illustrated in FIG. 13. For example, the first relative humidity h1 may be 60%, and the second relative humidity h2 may be 70%.

As described above, since a higher relative humidity of the room indicates a larger amount of vapor included in the air, the rate of condensation may increase on the discharge plate 20 and the discharge blade 50. Thus, there is a need to prevent condensation if the relative humidity of the room is within a preset range.

Upon determination that the sensed current relative humidity of the room is equal to or higher than the first relative humidity h1 and lower than the second relative humidity h2, the controller 100 may decrease the frequency of the compressor 60 to a first frequency to control the air conditioner 1 to perform cooling in a first operation mode R1.

The first frequency of the compressor 60 is lower than a frequency of the current cooling operation of the air conditioner 1. In addition, the first frequency may be modified within a preset range to provide a pleasant indoor temperature simultaneously with preventing condensation.

The controller 100 may control the frequency of the compressor 60 such that an amount of a circulating refrigerant is less than a predetermined reference value. As the amount of the circulating refrigerant decreases, the temperature of cool air located in the inner region B of the housing 10 increases, so that the temperatures of the discharge plate 20 and the discharge blade 50 becomes higher than the dew point temperature. Thus, condensation may be prevented.

The controller 100 may calculate the first frequency of the compressor 60 based on the current indoor temperature sensed by the temperature sensor 120 and the current relative humidity sensed by the humidity sensor 130 to control the frequency of the compressor 60 (520).

The controller 100 may control the air conditioner 1 to perform cooling in the first operation mode R1 to decrease the frequency of the compressor 60 to the first frequency based on the calculated first frequency (525).

That is, the controller 100 may calculate the first frequency based on a frequency calculation formula previously set by the user. Since the indoor temperature and the indoor relative humidity vary during the cooling operation of the air conditioner 1, the controller 100 may calculate the first frequency to prevent condensation in the air conditioner 1 at the current indoor temperature and indoor relative humidity by inserting the current indoor temperature and relative humidity respectively sensed by the temperature sensor 120 and the humidity sensor 130 into the frequency calculation formula.

The controller 100 may calculate the first frequency by using various calculation formulae such as Formula 1 below.

$$\alpha*(27°\ C.-T_R)+\beta*(60\%-R_H)+\gamma \quad \text{Formula 1}$$

In Formula 1, $\alpha$, $\beta$, and $\gamma$ are preset constants, $T_R$ is a current indoor temperature sensed by the temperature sensor 120, and $R_H$ is a current relative humidity sensed by the humidity sensor 130.

After calculating the first frequency of the compressor 60 based on the sensed current indoor temperature and the sensed current indoor relative humidity, the controller 100 may increase the temperature of cool air located in the inner region B of the housing 10 by controlling the compressor 60 at the calculated first frequency.

For example, when the indoor temperature is 24° C. and the indoor relative humidity is 50%, the cooling operation of the air conditioner 1 is performed at a frequency of the compressor 60 of about 45 Hz. If the indoor relative humidity increases to 65%, the first frequency calculated according to Formula 1 about is about 25 Hz, and thus the compressor 60 may be controlled at a lower frequency. That is, although the current indoor temperature is the same, the frequency of the compressor 60 may vary depending on the indoor relative humidity. In other words, the first frequency of the compressor 60 may be modified within a predetermined range in accordance with the indoor relative humidity and indoor temperature.

The controller 100 may determine whether the indoor relative humidity sensed by the humidity sensor 130 is equal to or higher than the present second relative humidity h2 (530). Upon determination that the current indoor relative humidity is higher than the second relative humidity h2, the controller 100 may decrease the frequency of the compressor 60 to a second frequency to control the air conditioner 1 to perform cooling in a second operation mode R2 (535).

That is, the indoor relative humidity may increase while the air conditioner 1 performs cooling in the first operation mode R1. Although FIG. 13 illustrates that the indoor relative humidity increases sequentially to the first relative humidity h1 and then the second relative humidity h2 during the cooling operation of the air conditioner 1, the indoor relative humidity may not sequentially increase but increase immediately to the second relative humidity h2 or higher.

That is, the indoor relative humidity may keep changing during the cooling operation of the air conditioner 1 due to external heat load, or the like.

If the indoor relative humidity is higher than the second relative humidity h2, the controller 100 may control the cooling operation in the second operation mode R2 by changing the first frequency of the compressor 60 to the second frequency lower than the first frequency.

If the indoor relative humidity is higher than the second relative humidity h2, a relatively large amount of vapor is included in the air. Thus, condensation occurring on the discharge plate 20 and the discharge blade 50 cannot be prevented by increasing the temperature of cool air located in the inner region B of the housing 10 by controlling the frequency of the compressor 60 at the first frequency.

Thus, the controller 100 may control the compressor 60 at the preset second frequency, and the second frequency is lower than that first frequency and a fixed value different from the first frequency. Also, the second frequency of the compressor 60 may be a minimum frequency that allows the cooling operation of the air conditioner 1.

That is, the controller 100 may control the temperatures of the discharge plate 20 and the discharge blade 50 to be higher than those of a case in which the frequency of the compressor 60 is the first frequency, by decreasing the frequency of the compressor 60 to the preset second frequency. The controller 100 controls the air conditioner 1 to perform the cooling operation in the second operation mode R2 by decreasing the frequency of the compressor 60 to the second frequency such that condensation does not occur on the discharge plate 20 and the discharge blade 50 even when the indoor relative humidity is higher than the second relative humidity h2.

While the air conditioner 1 performs the cooling operation in the first operation mode or second operation mode, the temperature sensor 120 may sense the indoor temperature in real time or at predetermined intervals, and the humidity sensor 130 may sense the indoor relative humidity in real time or at predetermined intervals.

The controller 100 may change the cooling operation mode from the first operation mode R1 to the second operation mode R2 or from the second operation mode R2 to the first operation mode R1 in accordance with the sensing results. If the sensed indoor relative humidity is lower than the first relative humidity h1, the first operation mode may be released by increasing the frequency of the compressor 60 to be equal to or higher than the first frequency.

The controller 100 may determine a time during which the air conditioner 1 performs the cooling operation in the second operation mode R2 (540). That is, if the air conditioner 1 performs the cooling operation in the second operation mode R2 for a predetermined time, the frequency of the compressor 60 is controlled at the second frequency so that the amount of the circulating refrigerant is less than a predetermined reference value. In this case, the predetermined time may be 60 minutes of the second operation mode R2 but may vary according to settings by the user.

Also, in the case where the air conditioner 1 performs cooling in the second operation mode R2 for a predetermined time, the relative humidity is continuously maintained at a high level in the room. It may be an unpleasant environment in which the indoor temperature and the indoor humidity are relatively high continues.

Thus, the controller 100 needs to control the air conditioner 1 to decrease a cooling temperature and reduce the indoor humidity. To this end, the controller 100 controls the discharge blade 50 to be located at the guide position 50a to open the outlet 14 (545) such that the heat-exchanged air is discharged out of the housing 10 through the outlet 14.

Also, the controller 100 increases the frequency of the compressor 60 to a third frequency and increases the rotation speed of the blower fan 45 to control the air conditioner 1 to perform cooling in the third operation mode (550).

The controller 100 may increase the frequency of the compressor 60 to the third frequency which is higher than the first and second frequencies to further lower the temperature of the discharge plate 20 and the discharge blade 50. That is, the cooling operation may be performed such that the amount of the circulating refrigerant of the air conditioner 1 is greater than a predetermined reference value by operating the compressor 60 at the preset third frequency.

Also, the controller 100 may prevent condensation that may occur on the discharge plate 20 and the discharge blade 50 by controlling the blower fan 45 to operate at a predetermined rotation speed and maintain a pleasant environment by decreasing the indoor temperature and indoor humidity.

The third frequency of the compressor 60 and the rotation speed of the blower fan 45 may be preset by the user and stored in the memory 150.

The controller 100 may control the cooling operation in the third operation mode by opening the outlet 14, increasing the frequency of the compressor 60, and increasing the rotation speed of the blower fan 45 and may change the operation mode of the air conditioner 1 when the indoor temperature and the relative humidity sensed during the third operation mode are lower than predetermined values.

The controller 100 may change the operation mode of the air conditioner 1 by sensing the indoor temperature and the indoor relative humidity in real time and maintain a pleasant indoor temperature while preventing condensation that may occur on the discharge plate 20 and the discharge blade 50.

As is apparent from the above description, the air conditioner according to an embodiment may maintain pleasant indoor temperature and humidity with no direct contact between the user and cool air by performing a cooling operation at a low speed through fine holes formed in the air conditioner and may prevent condensation on the surface of the air conditioner.

Also, the cooling operation may be efficiently performed by sensing the indoor temperature or indoor humidity in real time and determining the operation mode of the air conditioner based thereon.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
a housing comprising a discharge plate having a plurality of discharge holes and an outlet;
a heat exchanger configured to exchange heat with air introduced into the housing of the air conditioner;
a blower fan configured to allow the heat-exchanged air to flow through at least one of the discharge plate and the outlet;
a discharge blade having a plurality of blade holes, and configured to open and close the outlet; and
a controller configured to control the heat-exchanged air to be discharged through the plurality of discharge holes and the plurality of blade holes when the outlet is closed, and configured to control a frequency of a compressor at a predetermined value when an indoor relative humidity is within a predetermined range,
wherein the controller is further configured to control cooling in a first operation mode to control the frequency of the compressor at a first frequency when the indoor relative humidity is equal to or higher than a preset first relative humidity and lower than a preset second relative humidity,
wherein the controller is further configured to control cooling in a second operation mode to control the frequency of the compressor at a second frequency when the indoor relative humidity is equal to or higher than the preset second relative humidity,
wherein the second frequency is lower than the first frequency, and
the preset second relative humidity is higher than the preset first relative humidity.

2. The air conditioner according to claim 1, wherein the controller is further configured to calculate the first frequency of the compressor based on the indoor relative humidity and an indoor temperature, and the first frequency varies within a predetermined range in accordance with changes of the indoor relative humidity and the indoor temperature.

3. The air conditioner according to claim 1, wherein the controller controls the discharge blade to open the outlet to discharge the heat-exchanged air through the outlet when cooling is performed in the second operation mode for a predetermined time.

4. The air conditioner according to claim 3, wherein the controller controls cooling in a third operation to control the frequency of the compressor at a third frequency when cooling is performed in the second operation mode for the predetermined time.

5. The air conditioner according to claim 3, wherein the controller increases a rotation speed of the blower fan to increase a speed of air discharged through the open outlet when cooling is performed in the second operation mode for the predetermined time.

6. The air conditioner according to claim 1, further comprising:
a humidity sensor configured to acquire information about the indoor relative humidity by determining the indoor relative humidity; and
a temperature sensor configured to sense the indoor temperature.

7. An air conditioner comprising:
a housing comprising a discharge plate having a plurality of discharge holes, and an outlet;
a heat exchanger configured to exchange heat with air introduced into the housing of the air conditioner;
a blower fan configured to allow the heat-exchanged air to flow through at least one of the discharge plate and the outlet;
a discharge blade having a plurality of blade holes, and configured to open and close the outlet; and
a controller configured to control a first cooling operation based on a predetermined frequency of a compressor and a predetermined rotation speed of the blower fan, upon receiving a command to close the outlet and discharge the heat-exchanged air through the plurality of discharge holes and the plurality of blade holes, and configured to convert the first cooling operation into a second cooling operation when an indoor temperature is higher than a predetermined value after a predetermined time from a start of the first cooling operation.

8. The air conditioner according to claim 7, wherein the controller is further configured to maintain the first cooling operation when the indoor temperature is lower than the predetermined value.

9. The air conditioner according to claim 7, wherein in the second cooling operation, a frequency of the compressor is higher than the predetermined frequency.

10. The air conditioner according to claim 7, wherein in the second cooling operation, a rotation speed of the blower fan is higher than the predetermined rotation speed.

11. The air conditioner according to claim 7, wherein the controller converts the second cooling operation into the first cooling operation when the indoor temperature is equal to or lower than the predetermined value after the predetermined time from a start of the second cooling operation.

12. The air conditioner according to claim 7, further comprising:
an input configured to receive a control command to close the outlet and discharge the heat-exchanged air through the plurality of discharge holes and the plurality of blade holes.

13. The air conditioner according to claim 7, wherein the first cooling operation and the second cooling operation are cooling operations to close the outlet and discharge the heat-exchanged air through the plurality of discharge holes and the plurality of blade holes.

14. An air conditioner comprising:
- a housing comprising a discharge plate having a plurality of discharge holes, and an outlet;
- a heat exchanger configured to exchange heat with air introduced into the housing of the air conditioner;
- a blower fan configured to allow the heat-exchanged air to flow through at least one of the discharge plate and the outlet;
- a discharge blade having a plurality of blade holes, and configured to open and close the outlet; and
- a controller configured to control a direct cooling operation to open the outlet and discharge the heat-exchanged air through the outlet, and to control an indirect cooling operation to close the outlet and discharge the heat-exchanged air through the plurality of discharge holes and the plurality of blade holes when an indoor temperature reaches a preset value.

15. The air conditioner according to claim 14, wherein the controller is further configured to maintain the indoor temperature at the preset value by controlling the indirect cooling operation.

16. The air conditioner according to claim 14, wherein the controller is further configured to perform a dehumidification operation to remove moisture from a room when the indoor temperature reaches a predetermined setting value during the direct cooling operation.

17. The air conditioner according to claim 14, wherein the controller is further configured to maintain the indoor temperature at a setting value by performing the indirect cooling operation, when the indoor temperature reaches the setting value.

* * * * *